(12) United States Patent
Winston

(10) Patent No.: US 6,244,264 B1
(45) Date of Patent: Jun. 12, 2001

(54) NON-IMAGING OPTICAL ILLUMINATION SYSTEM

(75) Inventor: Roland Winston, Chicago, IL (US)

(73) Assignee: Solar Enterprises, International, LLC, Chicago, IL (US)

( * ) Notice: Subject to any disclaimer, the term of this patent is extended or adjusted under 35 U.S.C. 154(b) by 0 days.

(21) Appl. No.: 09/328,987

(22) Filed: Jun. 9, 1999

(51) Int. Cl.[7] .................................................. F24J 2/50
(52) U.S. Cl. ........................ 126/652; 126/653; 126/674; 126/570; 126/572; 126/585
(58) Field of Search .................... 126/652, 657, 126/674, 908, 570, 589, 585, 702, 597, 572; 160/120, 240

(56) References Cited

U.S. PATENT DOCUMENTS

| | | | |
|---|---|---|---|
| 2,030,350 | * | 2/1936 | Bremser ........................... 126/702 |
| 3,823,305 | * | 7/1974 | Schroder ........................... 126/400 |
| 3,830,288 | * | 8/1974 | Laing ................................ 126/400 |
| 3,915,147 | * | 10/1975 | Rineer .............................. 126/589 |
| 4,056,309 | * | 11/1977 | Harbison et al. ................. 126/570 |
| 4,059,093 | * | 11/1977 | Knowles et al. ................. 126/652 |
| 4,112,918 | * | 9/1978 | Palkes .............................. 126/596 |
| 4,119,085 | * | 10/1978 | Knowles et al. ................. 126/652 |
| 4,122,831 | * | 10/1978 | Mahdjuri .......................... 126/657 |
| 4,142,509 | * | 3/1979 | Hermann et al. ................. 126/706 |
| 4,159,712 | * | 7/1979 | Legg ................................. 126/570 |
| 4,220,139 | * | 9/1980 | Ramsden ......................... 126/702 |
| 4,231,353 | * | 11/1980 | Kanatani et al. ................. 126/652 |
| 4,290,473 | * | 9/1981 | Pierson et al. ................... 160/120 |
| 4,307,712 | * | 12/1981 | Tracy ............................... 126/652 |
| 4,321,419 | * | 3/1982 | Hanafin ............................ 126/570 |
| 4,382,436 | * | 5/1983 | Hager ............................... 126/572 |
| 4,446,850 | * | 5/1984 | Zilisch ............................. 126/589 |
| 4,455,998 | * | 6/1984 | Kroontje et al. ................. 126/652 |
| 4,494,526 | * | 1/1985 | Wurst et al. ..................... 126/585 |
| 4,531,511 | * | 7/1985 | Hochberg ......................... 126/706 |
| 4,579,107 | * | 4/1986 | Deakin ............................. 126/908 |
| 4,615,329 | * | 10/1986 | Takeuchi et al. ................. 126/657 |
| 4,658,806 | * | 4/1987 | Boozer ............................. 126/621 |
| 4,766,941 | * | 8/1988 | Sloop et al. ...................... 160/240 |
| 4,834,066 | * | 5/1989 | Collins et al. ................... 126/654 |
| 5,344,206 | * | 9/1994 | Middleton ........................ 126/240 |
| 5,625,742 | * | 4/1997 | Boffito et al. .................... 126/400 |
| 5,735,328 | * | 4/1998 | Salhoff et al. ................... 160/120 |

FOREIGN PATENT DOCUMENTS

| | | | | |
|---|---|---|---|---|
| 26 22 718 | * | 12/1977 | (DE) | ................................ 126/570 |
| 2006420 | * | 5/1979 | (GB) | ................................ 126/702 |
| 57-174654 | * | 10/1982 | (JP) | ................................ 126/570 |

* cited by examiner

*Primary Examiner*—Ira S. Lazarus
*Assistant Examiner*—David Lee
(74) *Attorney, Agent, or Firm*—Michael D. Rechtin; Foley & Lardner

(57) ABSTRACT

A passive solar collector has a reflector or a plurality of reflectors in a tube that is in a partial vacuum and is entirely or partly transparent. An absorber collects light reflected by the reflector or plurality of reflectors and delivers energy from the collected light to a central tube where it heats a substance such as water or other fluid. The absorber is disposed at an angle to the axis of the passive solar collector. The passive solar collector is protected against overheating by one or more devices such as a getter that releases a gas to reduce the vacuum or an opaque shield that is placed so as to cover the reflector in response to an indication of overheating. Reflecting surfaces of the solar collector may be symmetrical or asymmetrical, and they may be smooth or they may have dents, protrusions, or both. The surfaces of the solar collector may be smooth, ridged with smooth curves, or ridged with sharp curves. Collected heat is taken from an absorber to a heat exchanger for use; the absorber may be a double tube carrying a pumped liquid or it may be a heat pipe.

22 Claims, 33 Drawing Sheets

P(θ) = CONSTANT a = 0.055
b = 0.100
b = 12.36
c = 0.05136

(θ(φ) = ((φ−φ₀))

INVOLUTE PORTION

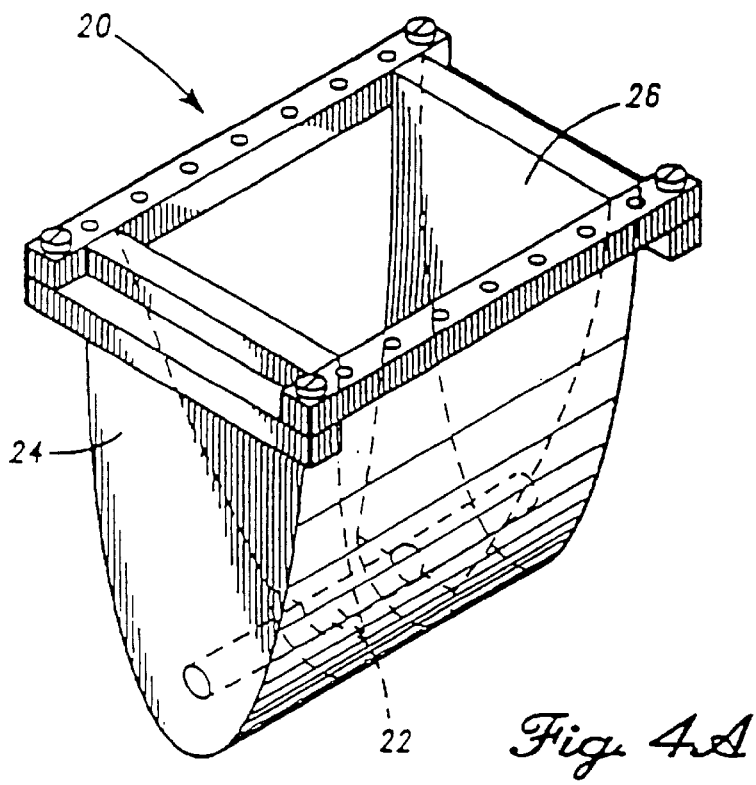
Fig. 4A
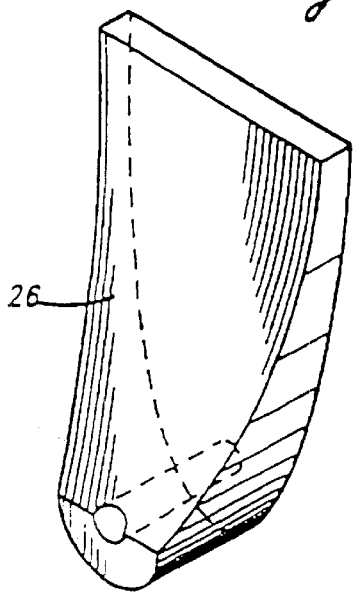
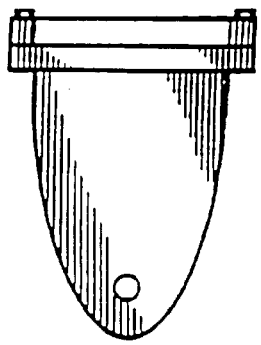
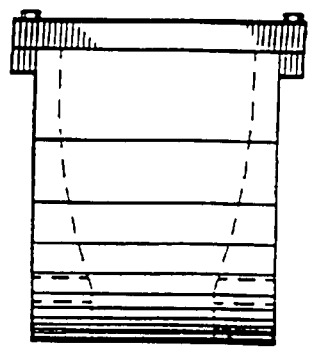
Fig. 4B  Fig. 4C  Fig. 4D

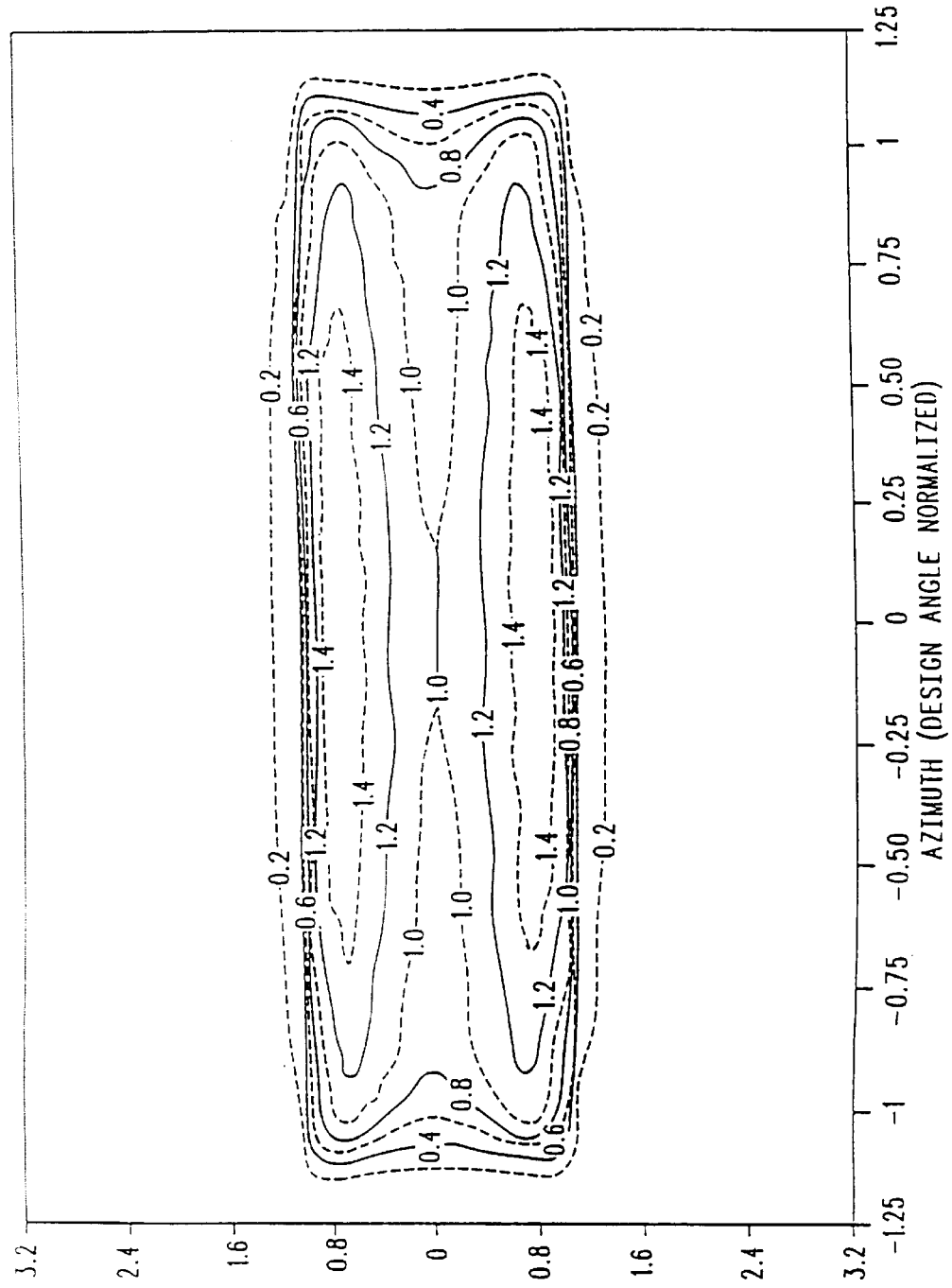

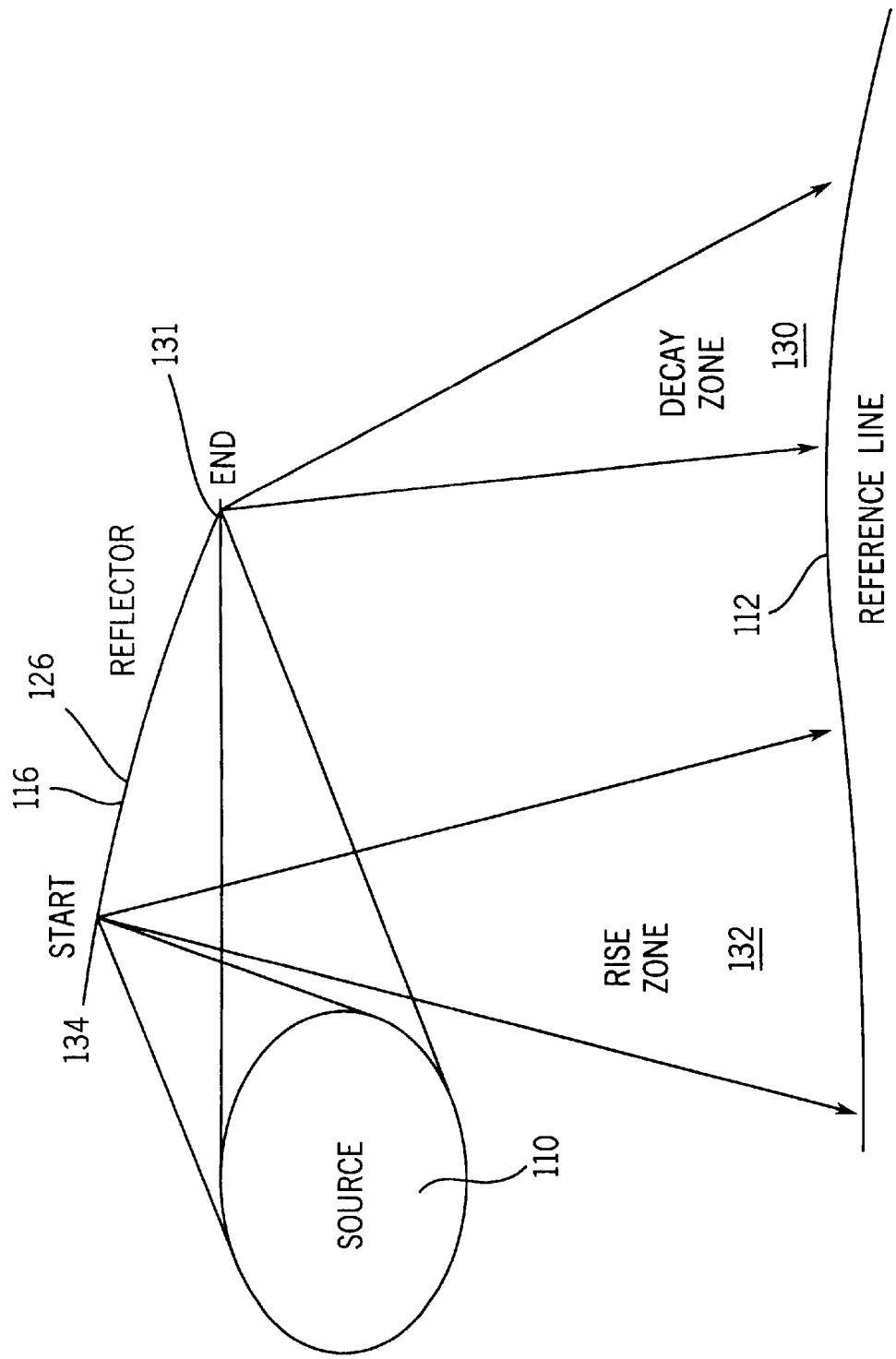

NON-IMAGING OPTICAL ILLUMINATION SYSTEM

BACKGROUND OF THE INVENTION

This invention is an improved stationary collector of light that is especially adapted to collect sunlight. In particular, it is a non-imaging solar concentrator with reflecting sections that may be symmetric or asymmetric and with one or more absorbers.

Non-imaging passive solar collectors have been used for a number of years to gather and use sunlight at elevated temperatures. The term "passive" is taken to mean a collector that can receive and use solar energy at a wide range of angles so that it does not need to be moved to track the sun. Of course, such a collector could also be caused to move if desired.

An example of a non-imaging collector is given in U.S. Pat. No. 5,537,991 entitled "Non-imaging Solar Collector", Winston et al., issued Jul. 23, 1996, which is incorporated here by reference as if set forth fully. The invention taught by that patent is a symmetric reflector with a central heat removal tube and a wedge-shaped absorber that extends from the absorber tube to or nearly to the symmetric reflector. The '991 patent has referred to the wedge-shaped absorber as exhibiting an "ice-cream-cone" geometry because its cross-section resembles an ice cream cone. The '991 patent overcomes some of the disadvantages of the prior art such as having radial fins that lose efficiency through re-radiation and also such as having non-concentrically disposed heat removal tubes. The '991 patent, however, has symmetric reflectors that place limits on their collection versatility over a range of angles of incidence of sunlight. It also has a wedge-shaped collector that extends from a central heat removal tube directly downward to the reflector. This also creates certain disadvantages in collection. The current state of the art is summarized in U.S. Pat. No. 5,586,013, entitled "Nonimaging Optical Illumination System," U.S. Pat. No. 5,816,693, entitled "Nonimaging Optical Illumination System," and U.S. Pat. No. 5,610,768, entitled "Nonimaging Radiant Energy Device."

When solar collectors are used, the radiant flux that they concentrate can create problems if the heat is not removed from the region of the absorber. This may happen, for example, if a pump circulating a coolant through the collector fails. If steps are not taken quickly, the collector may be damaged or even destroyed.

It is an object of the present invention to make a better passive solar collector.

It is a further object of the present invention to provide a passive solar collector that will maximize collection of solar energy at times of day when the air-conditioning load is at or near a maximum.

It is a further object of the present invention to provide a passive solar collector that will absorb a maximum amount of solar radiation and reradiate a minimum amount.

It is a further object of the present invention to provide a passive solar collector that is protected against excessive temperatures without the need for human intervention.

It is a further object of the present invention to provide a solar collector that includes as an absorber a thermos-bottle configuration.

It is a further object of the invention to provide an improved method and apparatus for producing a user-selected non-imaging optical output from natural light sources.

It is a further object of the invention to provide a novel method and apparatus for providing user-selected non-imaging optical output of light energy from optical designs by controlling edge rays of a light source.

Other objects will become apparent in the course of a detailed description of the invention.

SUMMARY OF THE INVENTION

A passive solar collector has a reflector, a central tube and an absorber that is connected to the central tube. The absorber may be symmetric about some axis or it may be asymmetric. The central tube may be a type of thermos bottle that heats an enclosed fluid, or it may be a heat removal tube, or it may be part of a heat pipe, or it may contain a pipe that circulates fluid to be heated. Different reflectors may be optimized for particular times of the year so that there may be a winter collector and a summer collector, or collectors for even more different parts of the year. The reflector and the absorber may be enclosed in a transparent tube that normally contains air at a pressure less than atmospheric pressure, or a gas such as argon, xenon, or a gaseous compound having poor heat-transfer characteristics. The collector is protected against overheating by one or more of several systems, including a getter that releases gases to spoil the vacuum when it is overheated and reabsorbs the gases when it cools to restore the vacuum. The getter may be barium, zirconium, or a commercial getter material. The collector may also be protected by a mechanically-operated shade that covers the collector if it overheats. The absorbent material may also be designed to reduce its absorption if it overheats, or the transparent tube may be treated with a material that darkens upon overheating to reduce the amount of light that is admitted.

BRIEF DESCRIPTION OF THE DRAWINGS

FIG. 4A shows a perspective view of a three-dimensional optical system for non-imaging illumination and FIG. 4B illustrates a portion of the optical system of FIG. 4A.

FIGS. 4C and 4D are respectively an end view and a side view of the system of FIG. 4A.

FIG. 5B illustrates non-imaging intensity output contours from a prior-art optical design.

FIG. 23 illustrates the effect of termination of the reflector on boundary illumination.

FIGS. 29b, 29c, and 29d are cross-sectional views of alternate embodiments of the solar collector of FIGS. 28 and 29a.

DETAILED DESCRIPTION OF THE INVENTION

A. Small Optical Sources

In the design of optical systems for providing non-imaging illumination using optical sources which are small relative to other system parameters, one should consider the limiting case where the source has no extent. That is, for example, the size of the source is much less than the closest distance of approach to any reflective or refractive component. Thus, the angle subtended by the source at any reflective or refractive component may be regarded as small. Our approximation of small source dimension, d, and large observer distance, D, amounts to $d<<R_0<<D$. This is in a sense the opposite of the usual non-imaging problem where the finite size and specific shape of the source is critical in determining the design. In any practical situation, a source of finite, but small, extent can better be accommodated by the small-source non-imaging design described herein rather than by the existing prior-art finite-source designs.

Figure 3B:
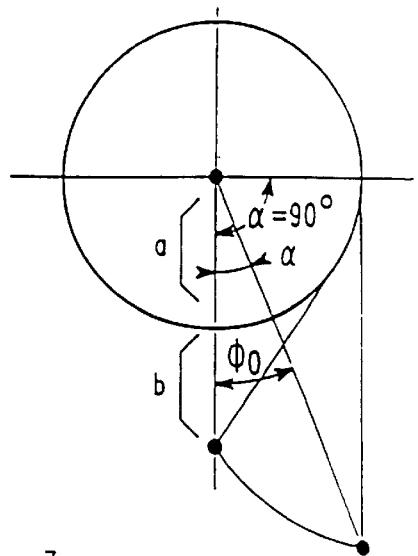
FIG. 3B shows the involute portion of the reflecting surface with selected critical design dimensions and angular design parameters associated with the source.
Figure 3A:
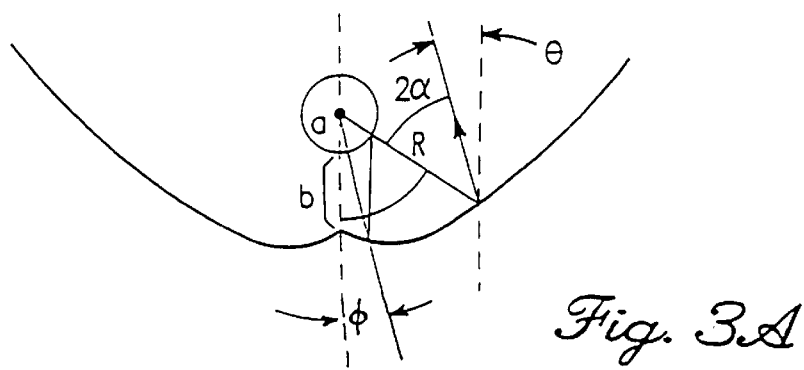
FIG. 3A illustrates a bottom portion of an optical system.

We can idealize a source by a line or point with negligible diameter and seek a one-reflection solution in analogy with the conventional "edge-ray methods" of non-imaging optics (see, for example, W. T. Welford and R. Winston "tHigh Collection Non-imaging Optics," Academic Press, New York, New York (1989)). Polar coordinates R and Φ are used with the source as origin and θ for the angle of the reflected ray as shown in FIG. 3A and 3B. The geometry in FIG. 3A shows that the following relation between source angle and reflected angle applies, $$D/d\Phi(\log R) = \tan \alpha, \tag{1}$$

where α is the angle of incidence with respect to the normal. Therefore, $$\alpha = (\Phi - \theta)/2. \tag{2}$$

Eq.(1) is readily integrated to yield, $$\log(R) = \int \tan a \, d\Phi + \text{constant}, \tag{3}$$

so that, $$R \cdot \text{constant} \exp[\int (\tan a \, d\Phi)]. \tag{4}$$

Eq.(4) determines the reflector profile R(Φ) for any desired functional dependence θ(Φ).

Suppose we wish to radiate power P with a particular angular distribution (Φ) from a line source which we assume to be axially symmetric. For example, P(Φ)=constant, from θ=0 to $\theta_1$ and P(θ)≅0 outside this angular range. By conservation of energy P(θ)dΦ=P(Φ)dΦ (neglecting material reflection loss) we need only ensure that, $$d\theta d\Phi = P(\Phi)/P(\theta), \tag{5}$$

to obtain the desire radiated beam profile. To illustrate the method, consider the above example of a constant P(θ) for a line source. By rotational symmetry of the line source, dP/dΦa constant so that, according to Eq.(4) we want θ to be a linear function of Φ such as θ=aΦ. Then the solution of Eq.(3) is, $$R = R_0/\cos k(\Phi/k), \tag{6}$$

where, $$k = 2/(1-a), \tag{7}$$

and $R_0$ is the value of R at Φ=0.

We note that the case a=0 (k=2) gives the parabola in polar form, $$R = R_0/\cos^2(\Phi/2), \tag{8}$$

while the case θ=constant=$\theta_1$ gives the off-axis parabola, $$R = R_0/\cos^2(\theta_1)/\cos^2[\Phi-\theta_0)/2]. \tag{9}$$

Suppose we desire instead to illuminate a plane with a particular intensity distribution. Then we correlate position on the plane with angle q and proceed as above. Turning next to a spherically symmetric point source, we consider the case of a constant P(Ω) where Ω is the radiated solid angle. Now we have by energy conservation.

$$P(\Omega)d\Omega = P(\Omega_0)d\Omega_0, \tag{10}$$

where $\Omega_0$ is the solid angle radiated by the source. By spherical symmetry of the point source P($\Omega_0$)=constant. Moreover, we have dΩ=(2π)d cos θ and d$\Omega_0$=(2π)d cos Φ; therefore, we need to make cos θ a linear function of cos Φ, $$\cos \theta = a \cos \Phi + b. \tag{11}$$

With the boundary conditions that θ=0 at Φ=θ and θ=$\theta_1$ at Φ=$\Phi_0$, we obtain, $$a = (1-\cos \theta_1)/(1-\cos \Phi_0, \tag{12}$$

$$b = (\cos \theta_1 - \cos \Phi_0)/(1-\cos \Phi_0). \tag{13}$$

For example, for $\theta_1$<<1 and $\Phi_0$≅π/2 we have θ≅√2$\theta_0$ sin(½Φ). This functional dependence is applied to Eq.(4) which is then integrated by conventional numerical methods.

A useful way to describe the reflector profile R(Φ) is in terms of the envelope (or caustic) of the reflected rays, r(Φ). This is most simply given in terms of the direction of the reflected ray, t=(−sin θ, cos θ). Since r(Φ) lies along a reflected ray, it has the form, $$r = R + Lt. \tag{14}$$

where R=R(sin $\Phi_1$−cos Φ). Moreover, $$Rd\Phi = Ld\theta, \tag{15}$$

which is a consequence of the law of reflection. Therefore, $$r = R + t/(d\theta/d\Phi). \tag{16}$$

In the previously cited case where θ is the linear function aΦ, the caustic curve is particularly simple, $$r = R + t/a. \tag{17}$$

In terms of the caustic, we may view the reflector profile as the locus of a taut string; the string unwraps from the caustic, r, while one end is fixed at the origin.

Figure 1:
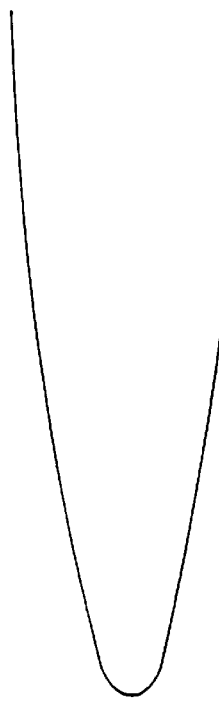
FIG. 1 shows a two-dimensional optical device for providing non-imaging output.

In any practical design the small but finite size of the source will smear by a small amount—the "point-like" or "line-like" angular distributions derived above. To prevent radiation from returning to the source, one may wish to "begin" the solution in the vicinity of θ=0 with an involute to a virtual source. Thus, the reflector design should be involute to the "ice cream cone" virtual source. It is well known in the art how to execute this result (see, for example, R. Winston, "Appl. Optics," Vol. 17, p. 166, 1978). Also, see U.S. Pat. No. 4,230,095 which is incorporated by reference herein. Similarly, the finite size of the source may be better accommodated by considering rays from the source to originate not from the center but from the periphery in the manner of the "edge rays" of non-imaging designs. This method can be implemented and a profile calculated using the computer program of the Appendix (and see FIG. 2) and an example of a line source and profile is illustrated in FIG. 1. Also, in case the beam pattern or source is not rotationally symmetric, one can use crossed two-dimensional reflectors in analogy with conventional crossed parabolic shaped reflecting surfaces. In any case, the present methods are most useful when the sources are small compared to the other parameters of the problem.

Various practical optical sources can include a long arc source which can be approximated by an axially symmetric line source. We then can utilize the reflector profile, R(Φ), determined here as explained in Eqs.(5) through (9) and the accompanying text. This analysis applies equally to two and three-dimensional reflecting surface profiles of the optical device.

Another practical optical source is a short arc source which can be approximated by a spherically symmetric point source. The details of determining the optical profile are shown in Eqs.(10) through (13).

Figure 5A:
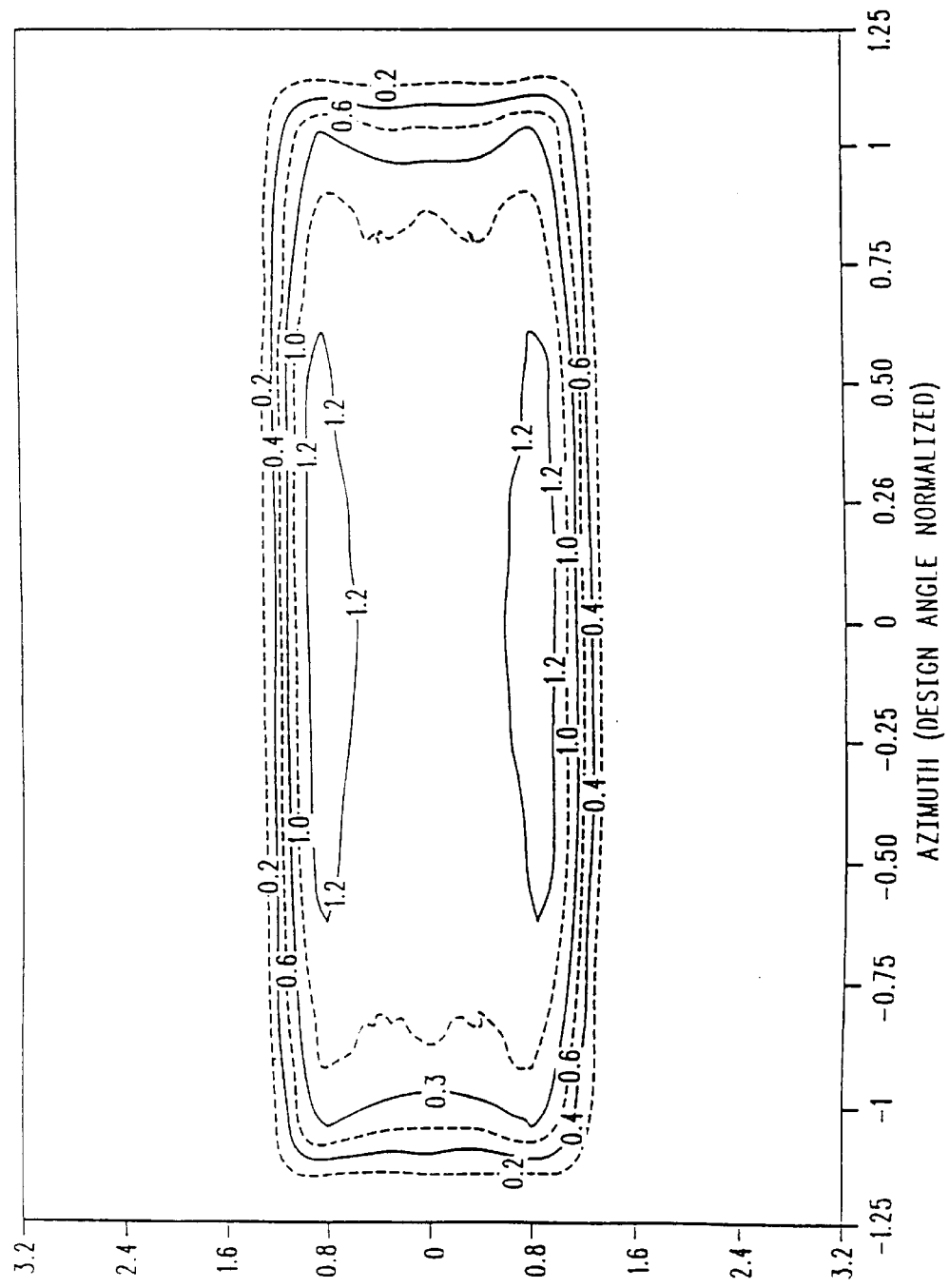
FIG. 5A shows intensity contours for an embodiment of the invention.

A preferred form of non-imaging optical system 20 is shown in FIGS. 4A, 4B, 4C, and 4D with a representative non-imaging output illustrated in FIG. 5A. Such an output can typically be obtained using conventional infrared optical sources 22 (see FIG. 4A)—for example, high-intensity arc lamps or graphite glow bars. Reflecting side walls 24 and 26 collect the infrared radiation emitted from the optical source 22 and reflect the radiation into the optical far field from the reflecting side walls 24 and 26. An ideal infrared generator concentrates the radiation from the optical source 22 within a particular angular range (typically a cone of about % 15 degrees) or in an asymmetric field of % 20 degrees in the horizontal plane by % 6 degrees in the vertical plane. As shown from the contours of FIG. 5B, the prior-art paraboloidal reflector systems (not shown) provide a non-uniform intensity output, whereas the optical system 20 provides a substantially uniform intensity output as shown in FIG. 5A. Note the excellent improvement in intensity profile from the prior-art compound parabolic concentrator (CPC) design. The improvements are summarized in tabular form in Table I, below.

TABLE I

Comparison of CPC with Improved Design

| | CPC | New Design |
|---|---|---|
| Ratio of Peak to On Axis Radiant Intensity | 1.58 | 1.09 |
| Ratio of Azimuth Edge to On Axis | 0.70 | 0.68 |
| Ratio of Elevation Edge to On Axis | 0.63 | 0.87 |
| Ratio of Corner to On Axis | 0.33 | 0.52 |
| Percent of Radiation Inside Useful Angles | 0.80 | 0.78 |
| Normalized Mouth Area | 1.00 | 1.02 |

In a preferred embodiment, designing an actual optical profile involves specification of four parameters. For example, in the case of a concentrator design, these parameters are, a=the radius of a circular absorber, b=the size of the gap, c=the constant of proportionality between $\theta$ and $\Phi-\Phi_0$ in the equation $\theta=c(\Phi-\Phi_0)$, and h=the maximum height.

A computer program has been used to carry out the calculations, and these values are obtained from the user (see lines six and thirteen of the program which is attached as a computer software Appendix included as part of the specification).

From $\Phi=0$ to $\Phi=\Phi_0$ in FIG. 3B the reflector profile is an involute of a circle with its distance of closest approach equal to b. The parametric equations for this curve are parameterized by the angle $\alpha$ (see FIG. 3A). As can be seen in FIG. 3B, as $\Phi$ varies from 0 to $\Phi_0$, $\alpha$ varies from $\alpha_0$ to ninety degrees. The angle $\alpha_0$ depends on a and b, and is calculated in line fourteen of the computer software program. Between lines fifteen and one hundred and one, fifty points of the involute are calculated in polar coordinates by stepping through these parametric equations. The (r, $\theta$) points are read into arrays r(i) and $\theta$(i), respectively.

For values of $\Phi$ greater than $\Phi_0$ the profile is the solution to the differential equation, $$d(1nr)/d\Phi=\tan\{\frac{1}{2}[(\Phi-\theta+arc\ \sin(a/r)]\}.$$

where $\theta$ is a function of $\Phi$. This makes the profile, r($\Phi$), a functional of $\theta$. In the sample calculation performed, $\theta$ is taken to be a linear function of $\Phi$ as in step 4. Other functional forms are described in the specification. It is desired to obtain one hundred fifty (r, $\theta$) points in this region. In addition, the profile must be truncated to have the maximum height, h. We do not know the (r, $\theta$) point which corresponds to this height, and thus, we must solve the above equation by increasing $\Phi$ beyond $\Phi_0$ until the maximum height condition is met. This is carried out using the conventional fourth-order Runge-Kutta numerical integration method between lines one hundred two and one hundred and fifteen. The maximum height condition is checked between lines one hundred sixteen and one hundred twenty.

Once the (r, $\theta$) point at the maximum height is known, we can set our step sizes to calculate exactly one hundred fifty (r,$\theta$) points between $\Phi_0$ and the point of maximum height. This is done between lines two hundred one and three hundred using the same numerical integration procedure. Again, the points are read into arrays r(i) and $\theta$(i).

In the end, we are left with two arrays, r(i) and $\theta$(i), each with two hundred components specifying two hundred (r, $\theta$) points of the reflector surface. These arrays can then be used for design specifications and ray trace applications.

In the case of a uniform beam design profile, (P($\theta$)= constant), a typical set of parameters is (also see FIG. 1), a=0.055 in., b=0.100 in., h=12.36 in.,and c=0.05136, for $\theta(\Phi)=c(\Phi-\Phi_0)$.

In the case of an exponential beam profile (P($\theta$)=ce$^{-a}\theta$) a typical set of parameters is:

a≅0 in., b=0.100 in., h=5.25 in., and c=4.694, for $\theta(\Phi)=0.131\ \ln(\Phi/c-1)$.

Power can be radiated with a particular angular distribution, $P^o(\theta)$, from a source which itself radiates with a power distribution, $P^o(\Phi)$. The angular characteristic of the source is the combined result of its shape, surface brightness and surface angular emissivity, at each point. A distant observer viewing the source fitted with the reflector under an angle, $\theta$, will see a reflected image of the source in addition to the source itself This image will be magnified by some factor, M, if the reflector is curved. Ideally both the source and its reflected image have the same brightness, so the power each produces is proportional to the apparent size. The intensity perceived by the observer, $P^o(\theta)$, will be the sum of the two, $$P^o(\theta)=P^o(\theta)+|M|P^o(\theta). \tag{18}$$

The absolute value of the magnification has to be taken, because if the reflected image and the source are on different sides of the reflector, and if we therefore perceive the image as reversed or upside down, then the magnification is negative. Actually, at small angles the source and its reflection image can be aligned so that the observer perceives only the larger of the two. But if M is large, one can neglect the direct radiation from the source.

Thus, one is concerned with the magnification of the reflector. A distant observer will see a thin source placed in the axis of a trough reflector magnified in width by a factor, $$Mm=d\Phi/d\theta. \tag{19}$$

This can be proved from energy conservation since the power emitted by the source is conserved upon reflection: $P^s d\Phi=MP^s d\theta$.

Figure 2:
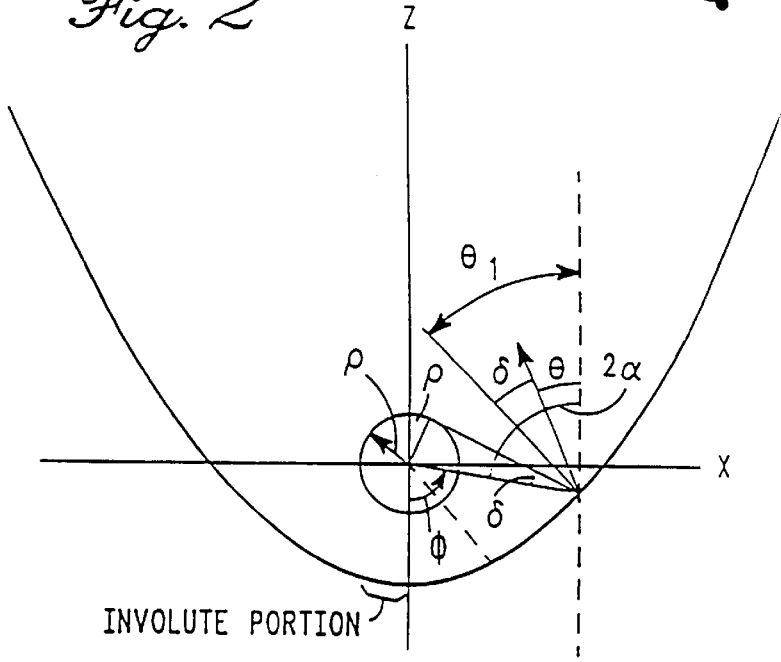
FIG. 2 illustrates a portion of the optical device of FIG. 1 associated with the optical source and immediate reflecting surface of the device.

For a rotationally symmetric reflector, the magnification, Mm, as given in Eq.(19), refers to the meridional direction. In the sagittal direction the magnification is, $$Ms=(d\mu_1/d\mu_2)=(\sin \Phi/\sin \theta), \quad (20)$$

where $\mu_1$ and $\mu_2$ are now small angles in the sagittal plane, perpendicular to the cross section shown in FIG. 2. Eq. (20) can be easily verified by noting that the sagittal image of an object on the optical axis must also lie on the optical axis. The reason for this is that because of symmetry, all reflected rays must be coplanar with the optical axis.

The total magnification, $M_t$, is the product of the sagittal and the meridional magnification, $$Mt=MsMm=d\cos(\Phi)/d\cos(\theta). \quad (21)$$

Actually Eq. (21) could also have been derived directly from energy conservation by noting that the differential solid angle is proportional to $d\cos(\theta)$ and $d\cos(\Phi)$ respectively.

Thus, inserting the magnification given in Eq.(21) or Eq.(19), as the case may be, into Eq.(18), yields the relationship between 101 and $\theta$ which produces a desired power distribution, P(g), for a given angular power distribution of the source, $P^s$. This relationship then can be integrated as outlined in Eq.(17) to construct the shape of the reflector which solves that particular problem.

There are two qualitatively different solutions depending on whether we assume the magnification to be positive or negative. If Mm>0, this leads to CEC-type devices; whereas, Mm<0 leads to CHC-type devices. The term CEC means Compound Elliptical Concentrator and CHC means Compound Hyperbolic Concentrator.

Now the question arises of how long we can extend the reflector or over what angular range we can specify the power distribution. From Eq.(17) one can see that if $\Phi-\theta=\pi$, then R diverges. In the case of negative magnification, this happens when the total power seen by the observer, between $\theta=0$ and $\theta=\theta^{max}$, approaches the total power radiated by the source, between $\Phi=0$ and $\Phi=\pi$.

A similar limit applies to the opposite side and specifies $\theta^{min}$. The reflector asymptotically approaches an infinite cone or V-trough. There is no power radiated or reflected outside the range $\theta^{min}<\theta<\theta^{max}$.

For positive magnification, the reflected image is on the opposite side of the symmetry axis (plane) to the observer. In this case, the limit of the reflector is reached as the reflector on the side of the observer starts to block the source and its reflection image. For symmetric devices this happens when $\Phi+\theta=\pi$. In this case too one can show that the limit is actually imposed by the first law. However, the reflector remains finite in this limit. It always ends with a vertical tangent. For symmetric devices where $\theta^{max}=-\theta^{min}$ and $\Phi^{max}=-\Phi^{min}$, the extreme directions for both the CEC-type and the CHC-type solution are related by, $$\Phi^{max}+\theta^{max}=\pi. \quad (22)$$

In general, CEC-type devices tend to be more compact. The mirror area needed to reflect a certain beam of light is proportional to $1/\cos(\alpha)$. The functional dependence of $\theta$ and $\Phi$ for symmetrical problems is similar except that they have opposite signs for CHC-type devices and equal signs for CEC-type solutions. Therefore, $\alpha$ increases much more rapidly for the CHC-type solution, which therefore requires a larger reflector—assuming the same initial value, $R_o$. This is visualized in FIG. 8 where the acceptance angle function as well as the incidence angle $\alpha$ are both plotted for the negative magnification solution.

To illustrate the above principles, consider a strip source as an example. For a narrow, one-sided Lambertian strip, the radiant power is proportional to the cosine of the angle. In order to produce a constant irradiance on a distant target, the total radiation of source and reflection should be proportional to $1/\cos^2(\theta)$. This yields, $$\cos\theta+|\cos(\Phi)d\Phi/d\theta|=\alpha/\cos^2(\theta). \quad (23)$$

In this case, the boundary condition is $\theta=0$, at $\Phi=\pm\pi/2$, because we assume that the strip only radiates on one side, downward. Eq.(11) can only be integrated for $\alpha=1$, $$\sin\Phi=1-|\tan(\theta)-\sin(\theta)|. \quad (24)$$

Figure 8:
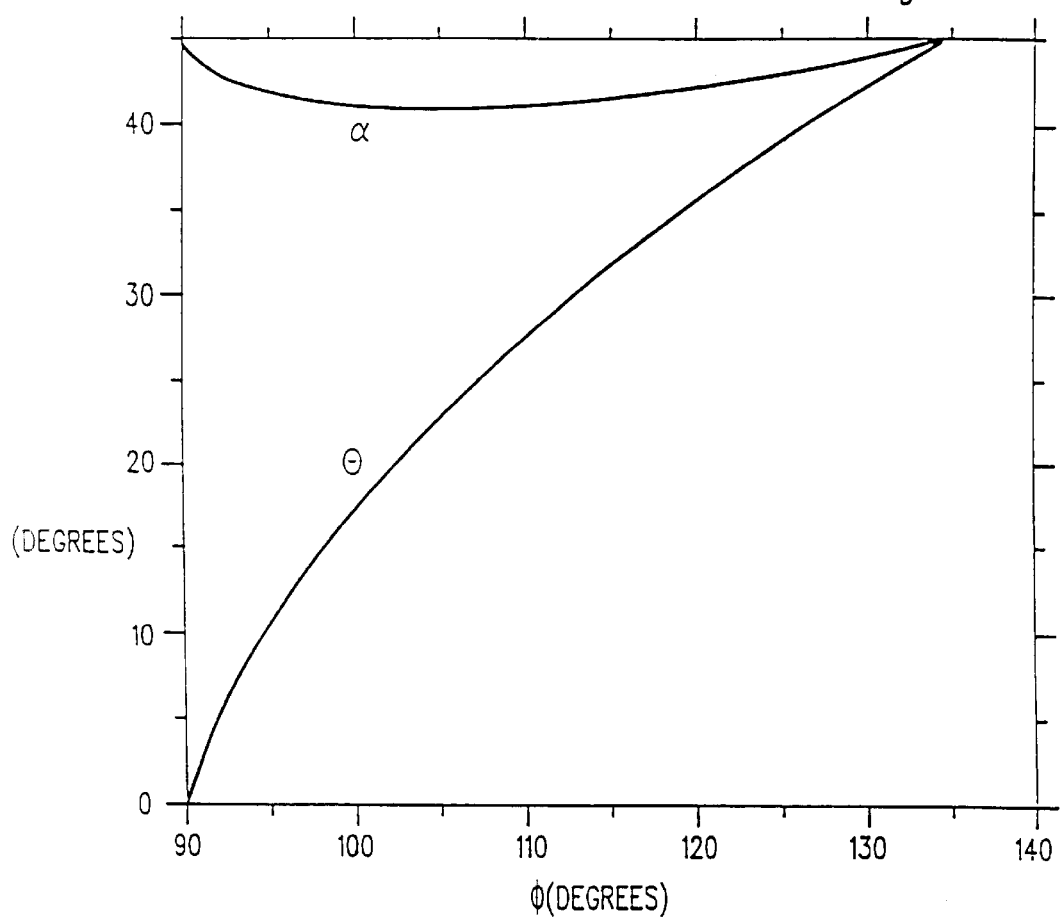
FIG. 8 shows an acceptance angle function which produces a constant irradiance on a distant plane from a narrow one-sided Lambertian strip source (two-dimensional) with a=1.
Figure 9:
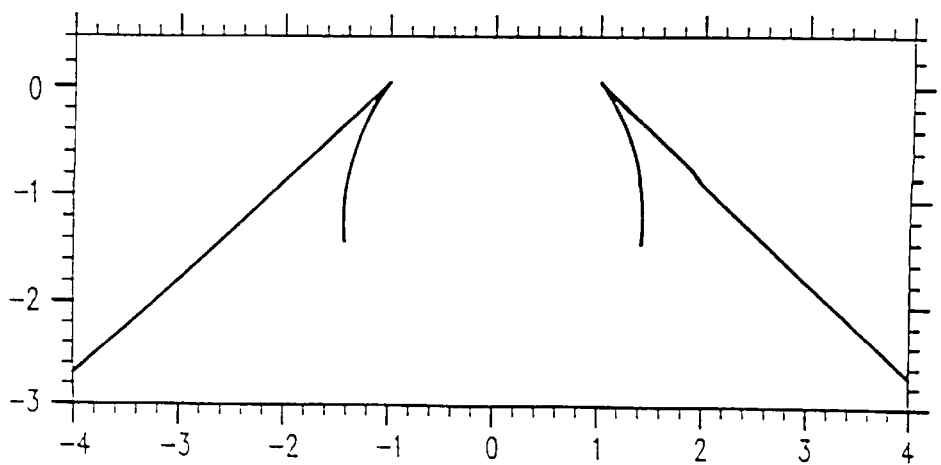
FIG. 9 illustrates a reflector profile which produces a constant irradiance on a distant plane from a one-sided Lambertian strip source (two-dimensional) at the origin, $R(\Phi=\pi/2)=1$, a=1. CEC (inner curve) and CHC-type solutions (outer truncated curve) are shown.

The acceptance angle function $\theta$ as well as the incidence angle for the CEC-type solution are shown in FIG. 8. Integrating Eq.(24) yields the reflector shapes plotted in FIG. 9.

Figure 10:
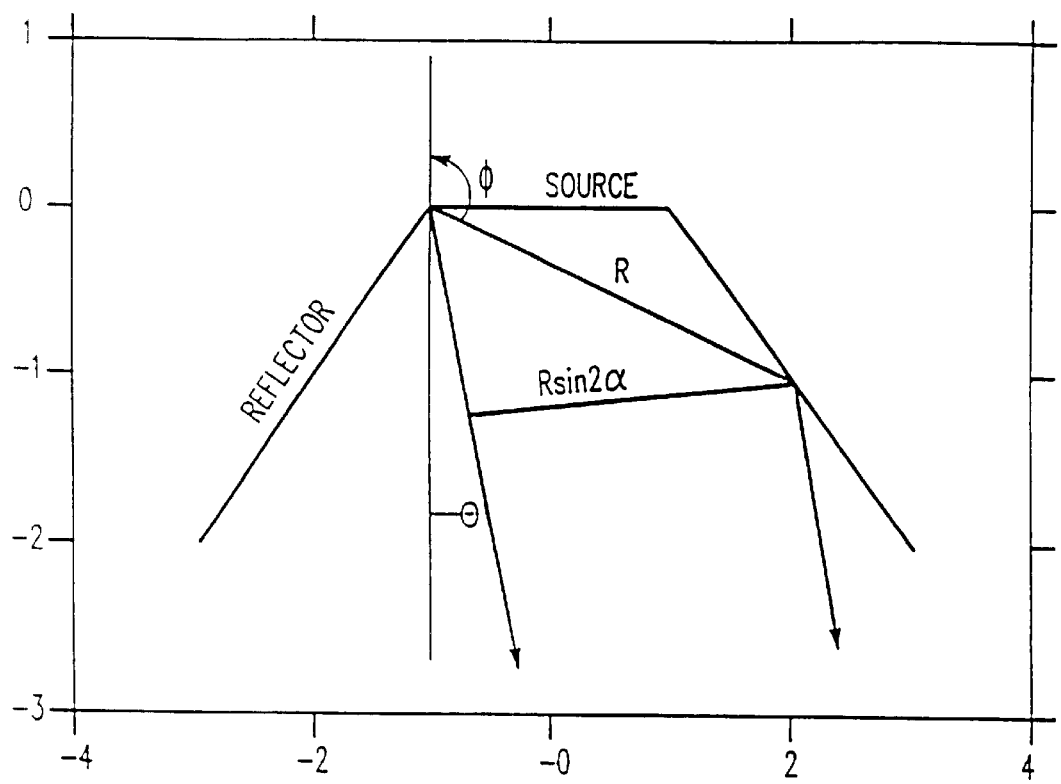
FIG. 10 shows a reflector designed to produce a reflected image adjacent to the source; the combined intensity radiated in the direction $-\theta$ is determined by the separation of the two edge rays, $R\sin^2\alpha$.

The analytical tools described herein can be used to solve real problems which involve reflectors close to the source. This is done by combining the above technique with the edge-ray method which has proved so effective in non-imaging designs. That is, the above methods can be applied to edge rays. As a first example, a reflector is designed for a planar, Lambertian strip source so as to achieve a predetermined far-field irradiance. The reflector is designed so that the reflected image is immediately adjacent to the source. This is only possible in a negative-magnification arrangement. Then the combination of source and its mirror image is bounded by two edge rays as indicated in FIG. 10. The combined angular power density for a source of unit brightness radiated into a certain direction is given by the edge ray separation, $$R\sin(2\alpha)=P^o(\theta). \quad (25)$$

By taking the logaritnmic derivative of Eq.(25) and substituting, $$d(\log(R))/d\Phi=\tan\alpha, \quad (26)$$

we obtain, $$d\alpha/d\theta=\sin(2\alpha)d\log(P^o(\theta)/2d\theta-\sin^2(\alpha). \quad (27)$$

This describes the right-hand side, where $\theta<0$. The other side is the mirror image.

For $2\alpha=\pi$, R diverges just as in the case of the CHC-type solutions for small sources. Thus, in general, the full reflector extends to infinity. For practical reasons it will have to be truncated. Let's assume that the reflector is truncated at a point, T, from which the edge ray is reflected into the direction, $\theta_\tau$. For angles $\theta$ in the range $\pm\theta_\tau$, the truncation has no effect because the outer parts of the reflector do not contribute radiation in that range. Therefore, within this range the truncated reflector also produces strictly the desired illumination. Outside this range the combination of source plus reflector behaves like a flat source bounded by the point, T, and the opposite edge of the source. Its angular power density is given by Eq.(13), with $R=R_\tau$=constant. The total power, $P_\tau$, radiated beyond $\theta_\tau$ is thus, $$P_\tau = R(\theta_\tau)\int_{2\theta_\tau}^{\pi} \sin y\, dy = R(\theta_\tau)(1+\cos(2\alpha_\tau)) \quad (28)$$

In order to produce an intensity $P^o(\theta_\tau)$, at $\theta_\tau$, $R(\theta_\tau)$ must be, $$R(\theta_\tau) = \frac{P^0(\theta_\tau)}{\sin(2\alpha_\tau)} \qquad (29)$$

The conservation of total energy implies that the truncated reflector radiates the same total power beyond $\theta_\tau$ as does the untruncated reflector, $$\frac{1+\cos(2\alpha_\tau)}{\sin(2\alpha_\tau)} = \frac{1}{P^0(\theta_\tau)}\int_{\theta\max}^{\theta_\tau} P^0(\psi)d\psi = B(\theta_\tau) \qquad (30)$$

This equation must hold true for any truncation $\theta=\theta_\tau$. It allows us to explicitly calculate $\alpha$, and with it $\Phi$ and R, in closed form as functions of $\theta$, if $B(\theta)$—that is, the integral of $P^o(\theta)$—is given in closed form. The conservation of total energy also implies that the untruncated reflector radiates the same total power as the bare source. This leads to the normalizing condition, $$B(0) = \frac{1}{P^0(\theta)}\int_{\theta\max}^{\theta} P^0(\psi)d\psi = 1. \qquad (31)$$

This condition may be used to find $\theta^{max}$; it is equivalent to setting $\theta\tau=0$ and $2\alpha\tau=\pi/2$ in Eq.(30). Solving Eq.(30) for $\alpha$ yields, $$B(0) = \frac{1}{P^0(\theta)}\int_{\theta\max}^{\theta} P^0(\psi)d\psi = 1. \qquad (32)$$

Substituting $\alpha=(\Phi-\theta)/2$, yields the acceptance angle function.

$$\Phi(\theta)=\theta+2\alpha. \qquad (33)$$

From Eq. (25) the radius is given by, $$R(\theta) = P^0(\theta)\frac{B^2+1}{2B}. \qquad (33)$$

These equations specify the shape of the reflector in a parametric polar representation for any desired angular power distribution, $P^o(\theta)$.

A straightforward calculation shows that Eq.(32) is indeed the solution of the differential equation (27). In fact, Eq.(27) was not needed for this derivation of the reflector shape. We have presented it only to show the consistency of the approach.

For example, to produce a constant irradiance on a plane parallel to the source we must have $P^o(\theta)=1/\cos^2(\theta)$, and thus $B(\theta)=\cos^2(\theta)-\tan(\theta)-\tan(\theta_{max}))$. Using Eq.(31), we find $\theta_{max}=-\pi 4$, so that $B(\theta)=\cos^2(\theta)(\tan(\theta)+1)$ with no undetermined constants.

Figure 11:
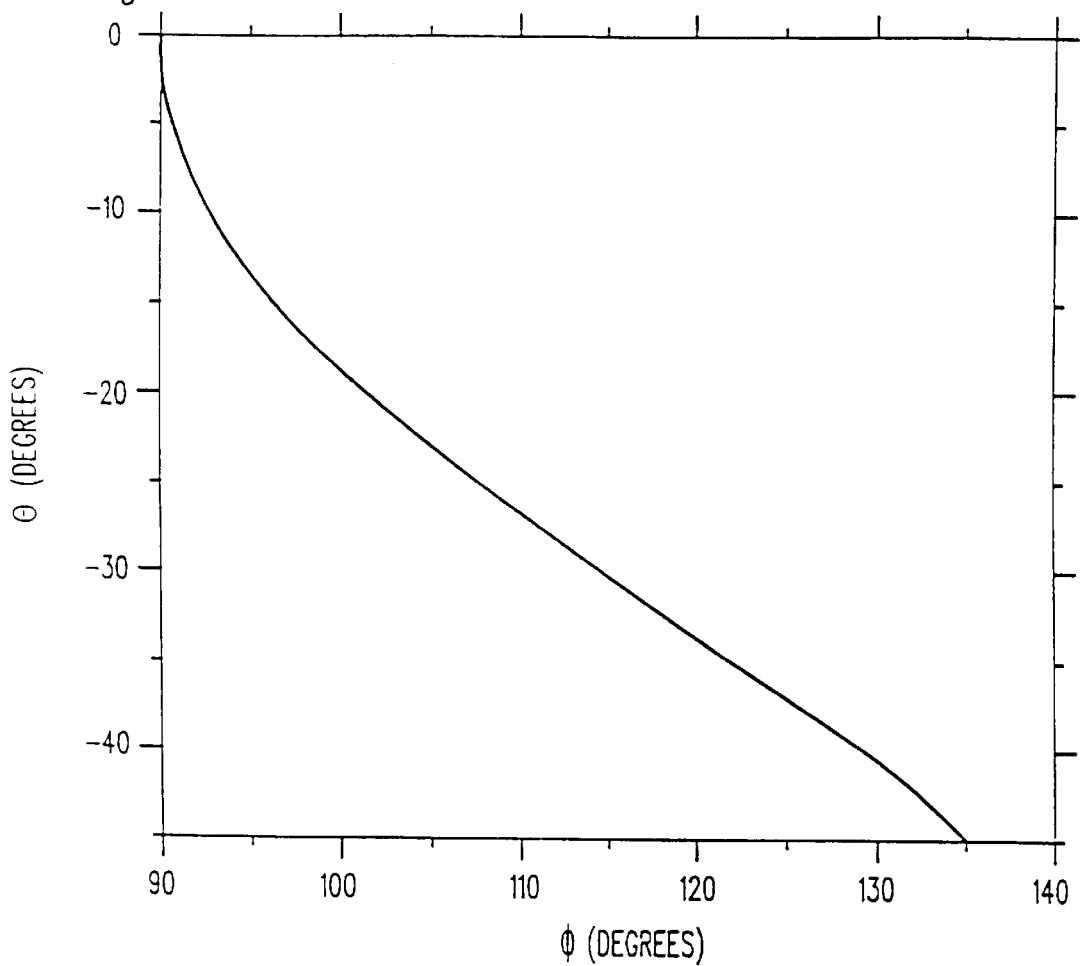
FIG. 11 illustrates an acceptance angle function which produces a constant irradiance on a distant plane from a finite one-sided Lambertian strip source; there is only a CHC-type solution.
Figure 12:
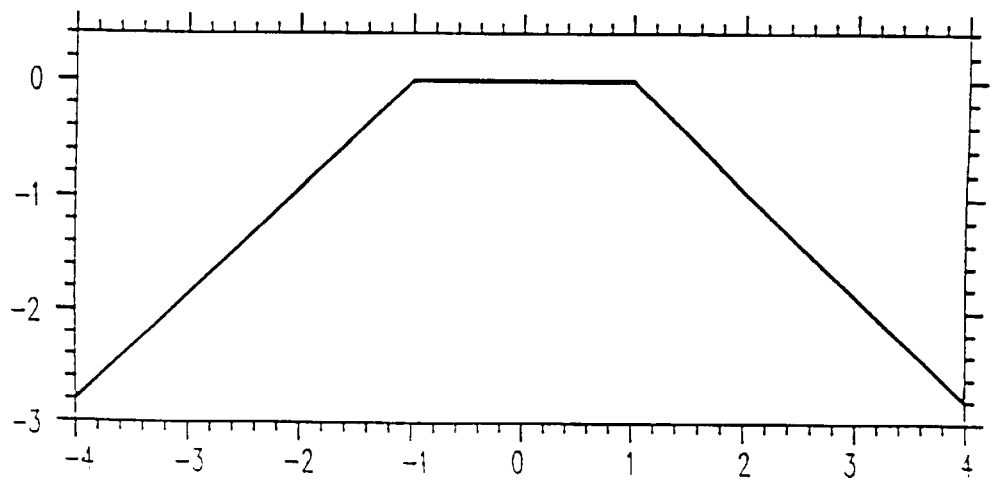
FIG. 12 shows a reflector profile which produces a constant irradiance on a distant plane from a finite one-side Lambertian strip source of width two units; note that there is only a CHC-type solution and it is truncated.
Figure 13:
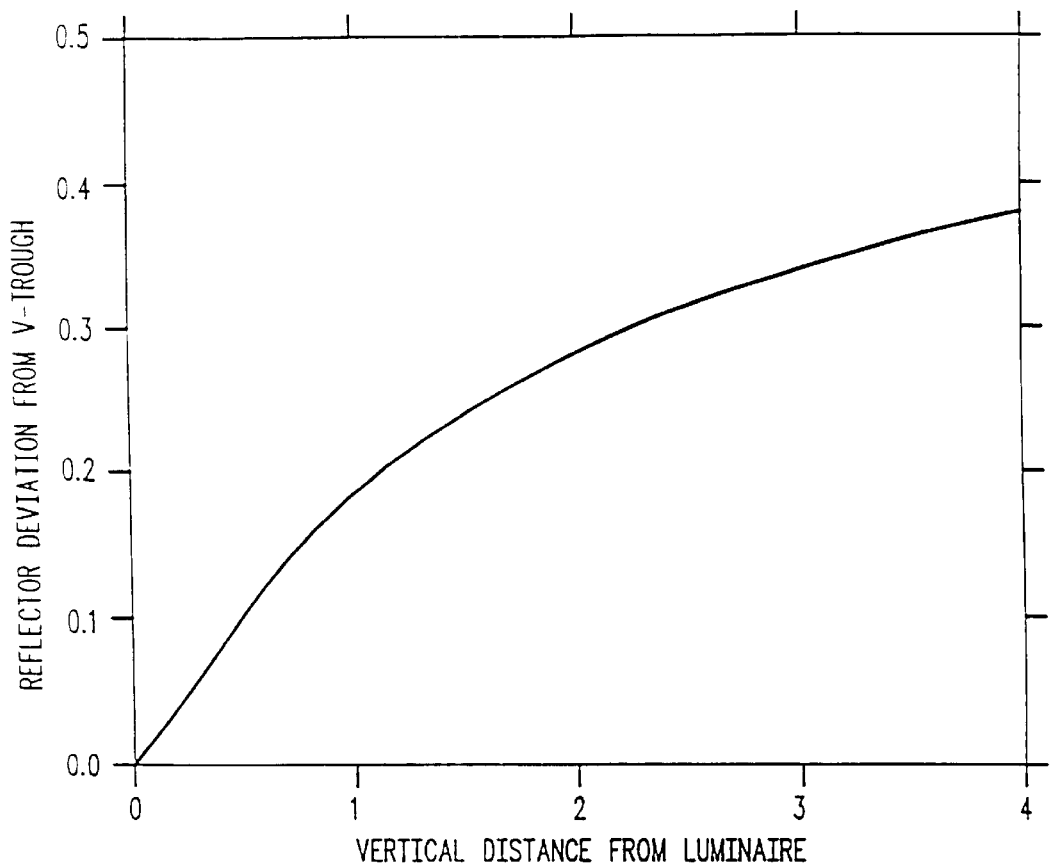
FIG. 13 illustrates a deviation of the reflector depicted in FIG. 12 from a true V-trough.
Figure 17:
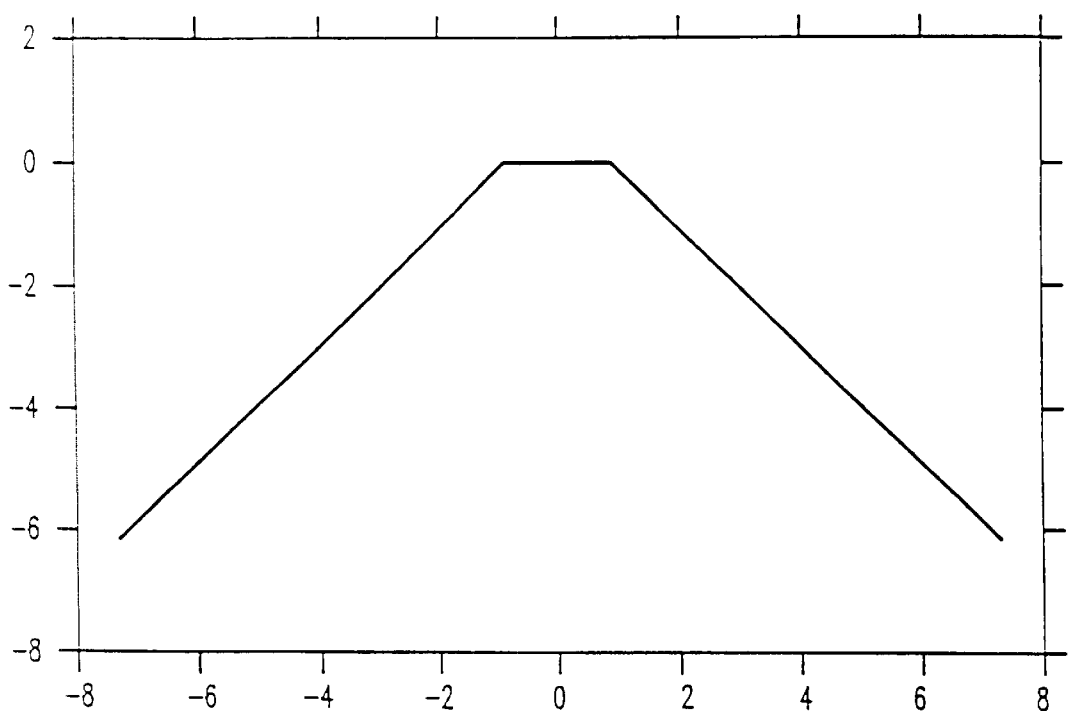
FIG. 17 illustrates a reflector profile which produces the desired irradiance shown in FIG. 13 on a distant plane from a finite one-sided Lambertian strip source of width two units; note that there is only a CHC-type solution and it is truncated.

The resulting acceptance angle function and the reflector profile are shown in FIG. 11 and FIG. 17, respectively. The reflector shape is close to a V-trough. Though, the acceptance angle function is only poorly approximated by a straight line, which characterizes the V-trough. In FIG. 13 we show the deviation of the reflector shape depicted in FIG. 12 from a true V-trough. Note that a true V-trough produces a markedly non-constant irradiance distribution proportional to $\cos(\theta+\pi/4)\cos(\theta)$, for $0<-\theta<\pi/4$.

Figure 14:
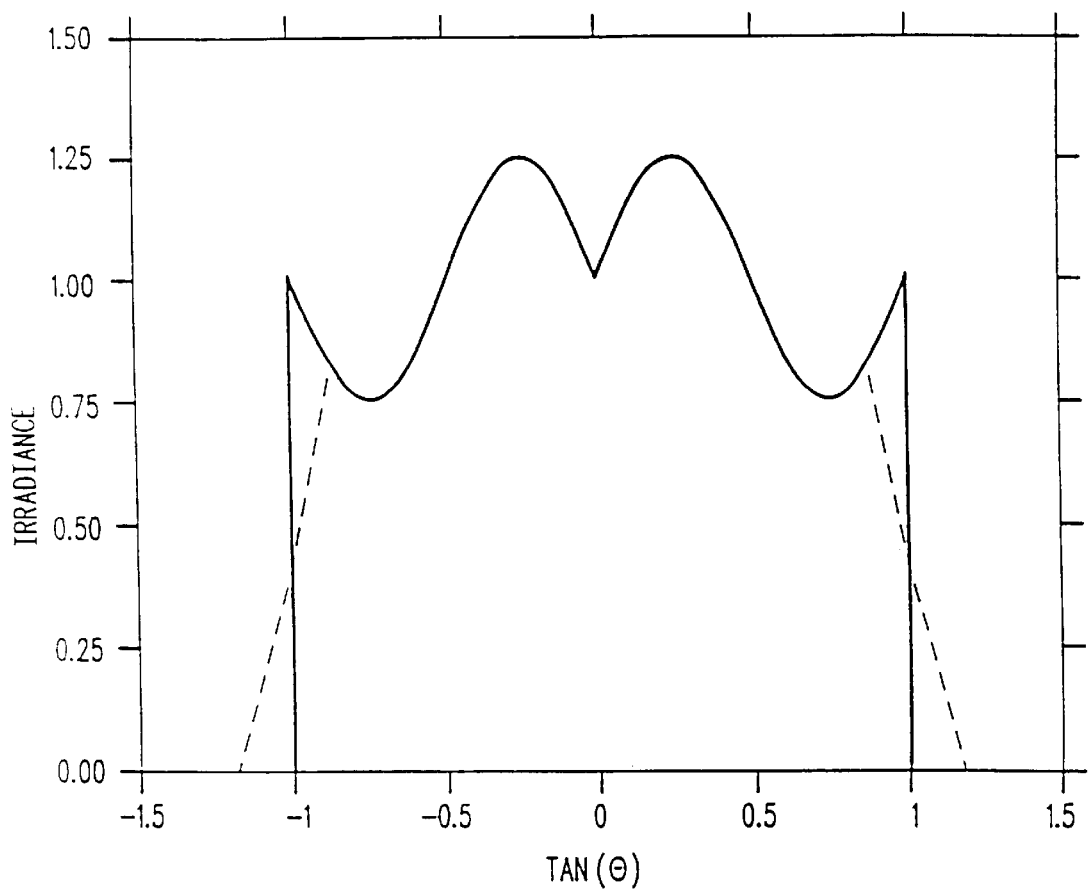
FIG. 14 shows a desired irradiance distribution on a distant plane perpendicular to the optical plane divided by the irradiance produced along the axis by the source alone; a broken line shows the irradiance of a truncated device.
Figure 15:
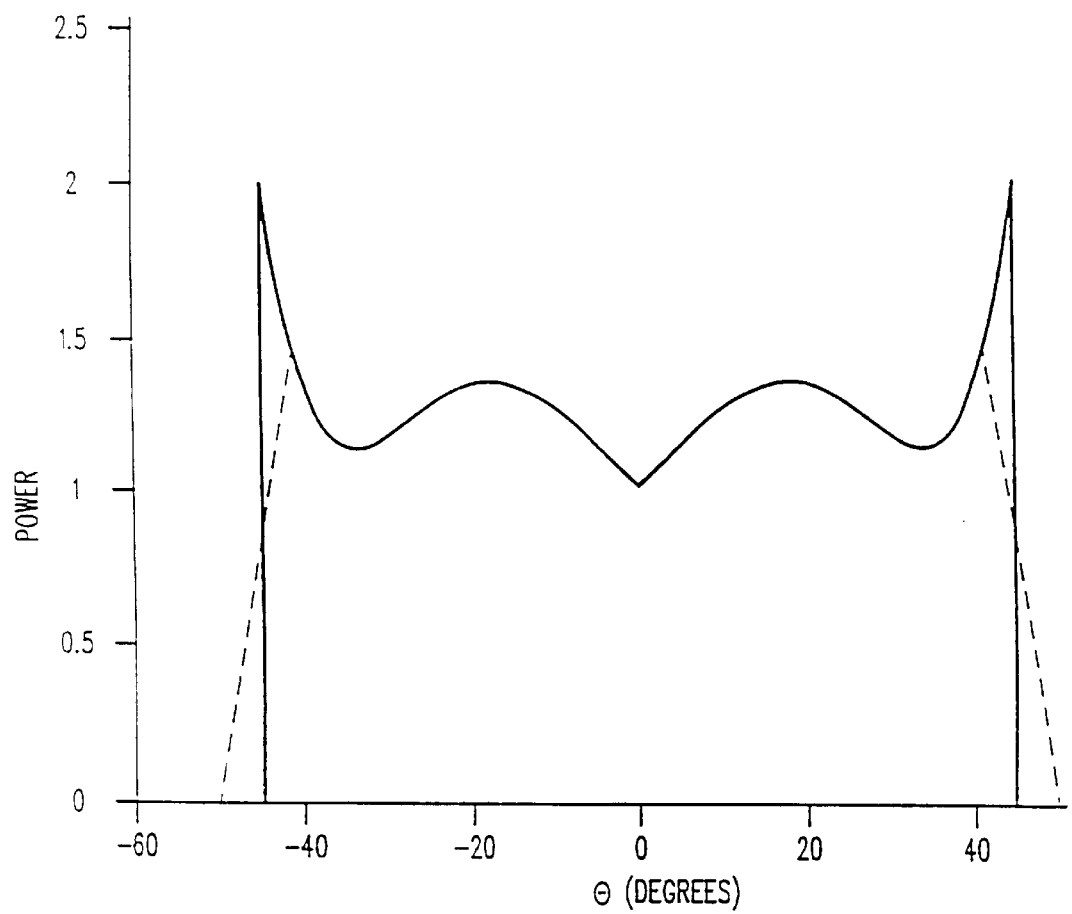
FIG. 15 illustrates an angular power distribution corresponding to the irradiance distribution shown in FIG. 13; a broken line refers to a truncated device.
Figure 16:
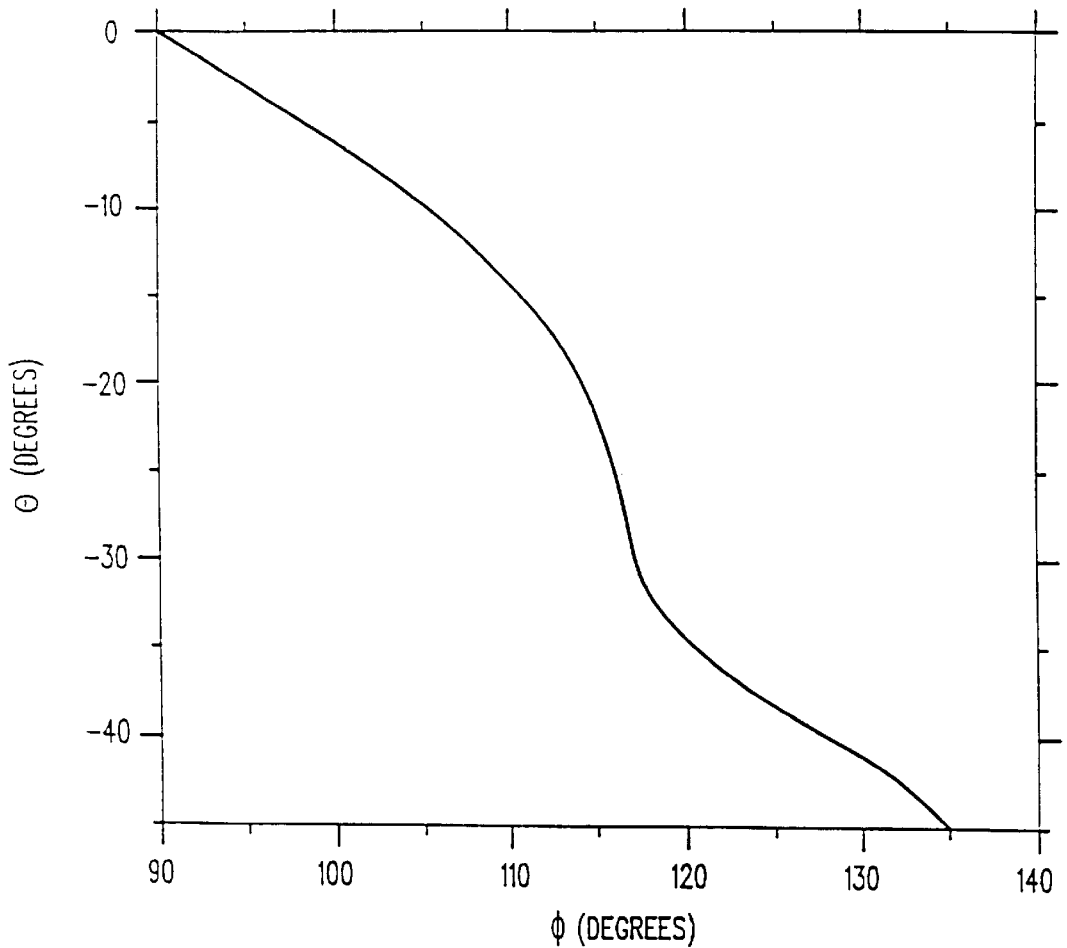
FIG. 16 shows an acceptance angle function corresponding to the desired irradiance distribution plotted in FIG. 13.

As a second example for a specific non-constant irradiance a reflector produces the irradiance distribution on a plane shown in FIG. 14. The corresponding angular power distribution is shown in FIG. 15. The acceptance angle function according to Eq. (33) and (32) and the resulting reflector shape according to Eq.(34) are visualized in FIG. 16 and FIG. 17.

Figure 18:
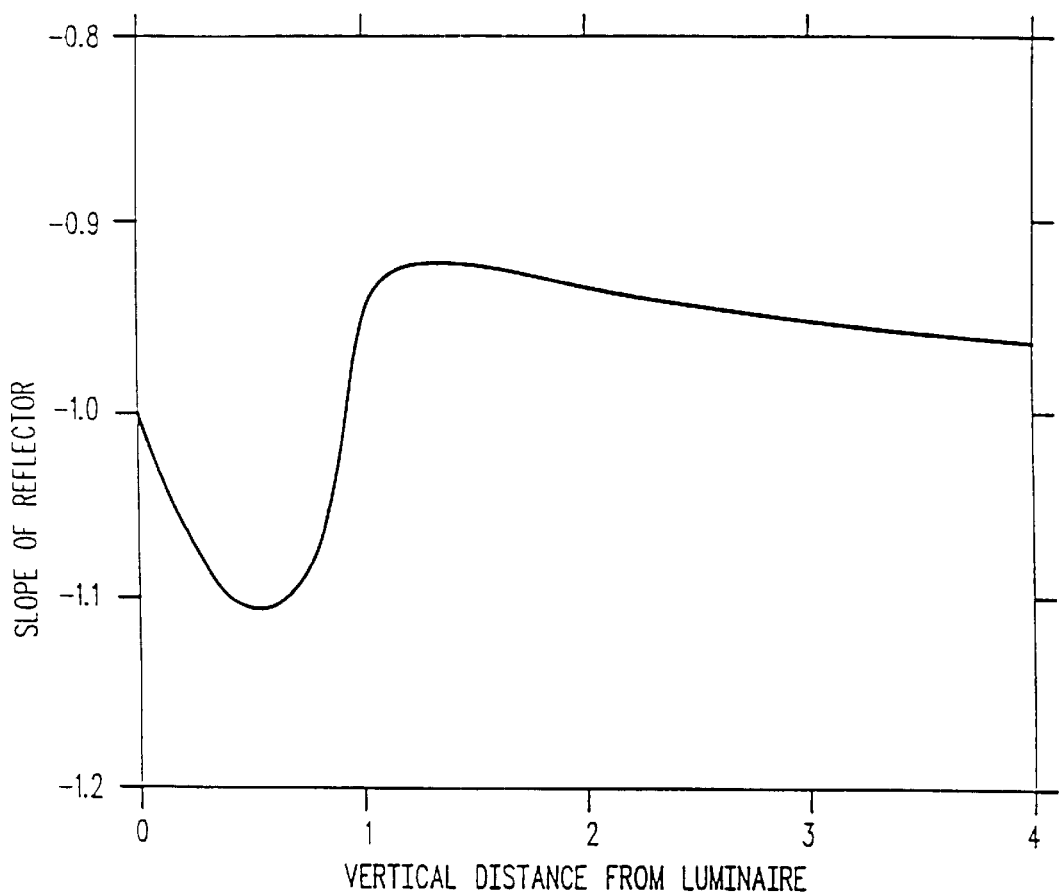
FIG. 18 shows the slope of the reflector as a function of vertical distance from the source.
Figure 19:
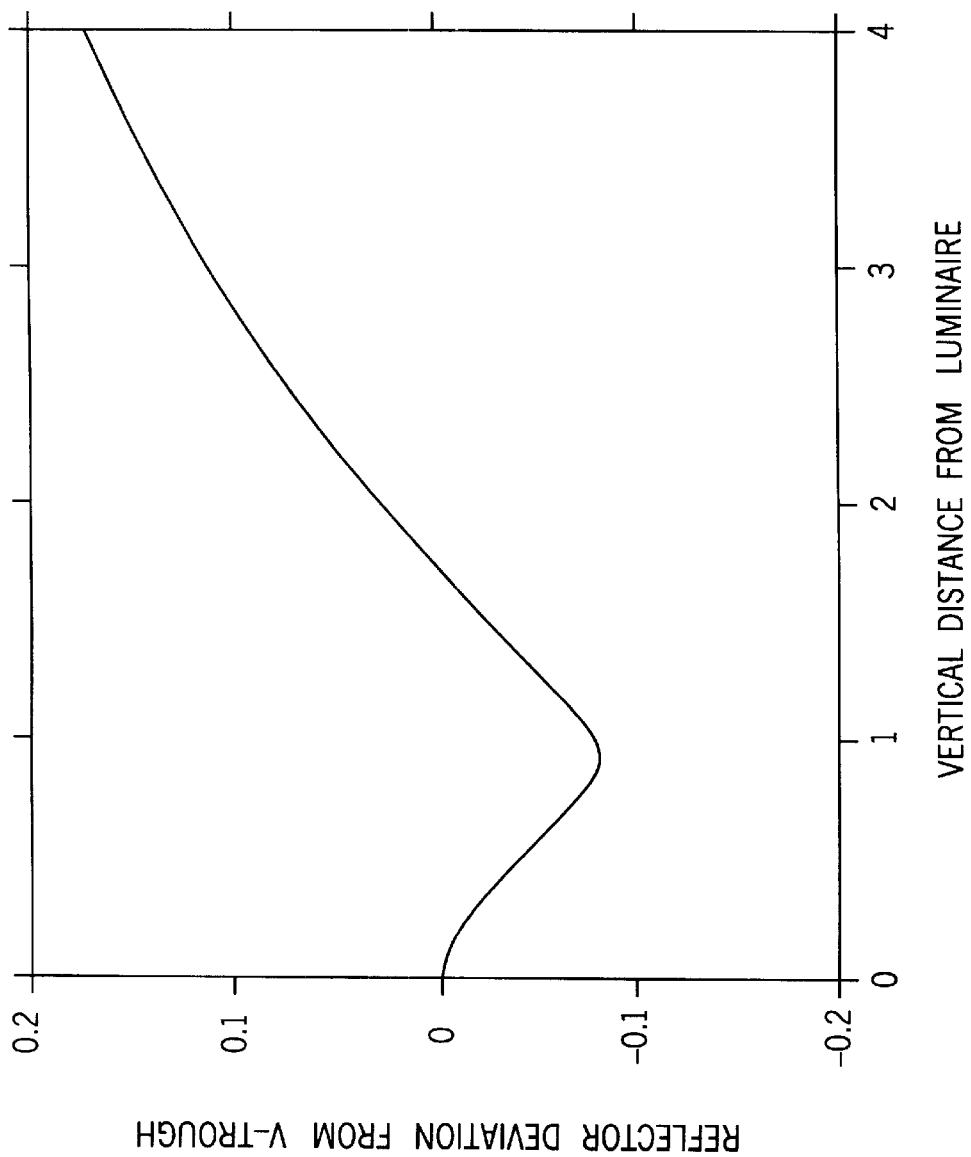
FIG. 19 illustrates the deviation of the reflector depicted in FIG. 16 from a true V-trough.

Although the desired irradiance in this example is significantly different from the constant irradiance treated in the previous example, the reflector shape again superficially resembles the V-trough and the reflector of the previous example. The subtle difference between the reflector shape of this example and a true V-trough are visualized in FIG. 18 and FIG. 19, where we plot the slope of our reflector and the distance to a true V-trough. Most structure is confined to the region adjacent to the source. The fact that subtle variations in reflector shape have marked effects on the power and irradiance distribution of the device can be attributed to the large incidence angle with which the edge rays strike the outer parts of the reflector.

Figure 20:
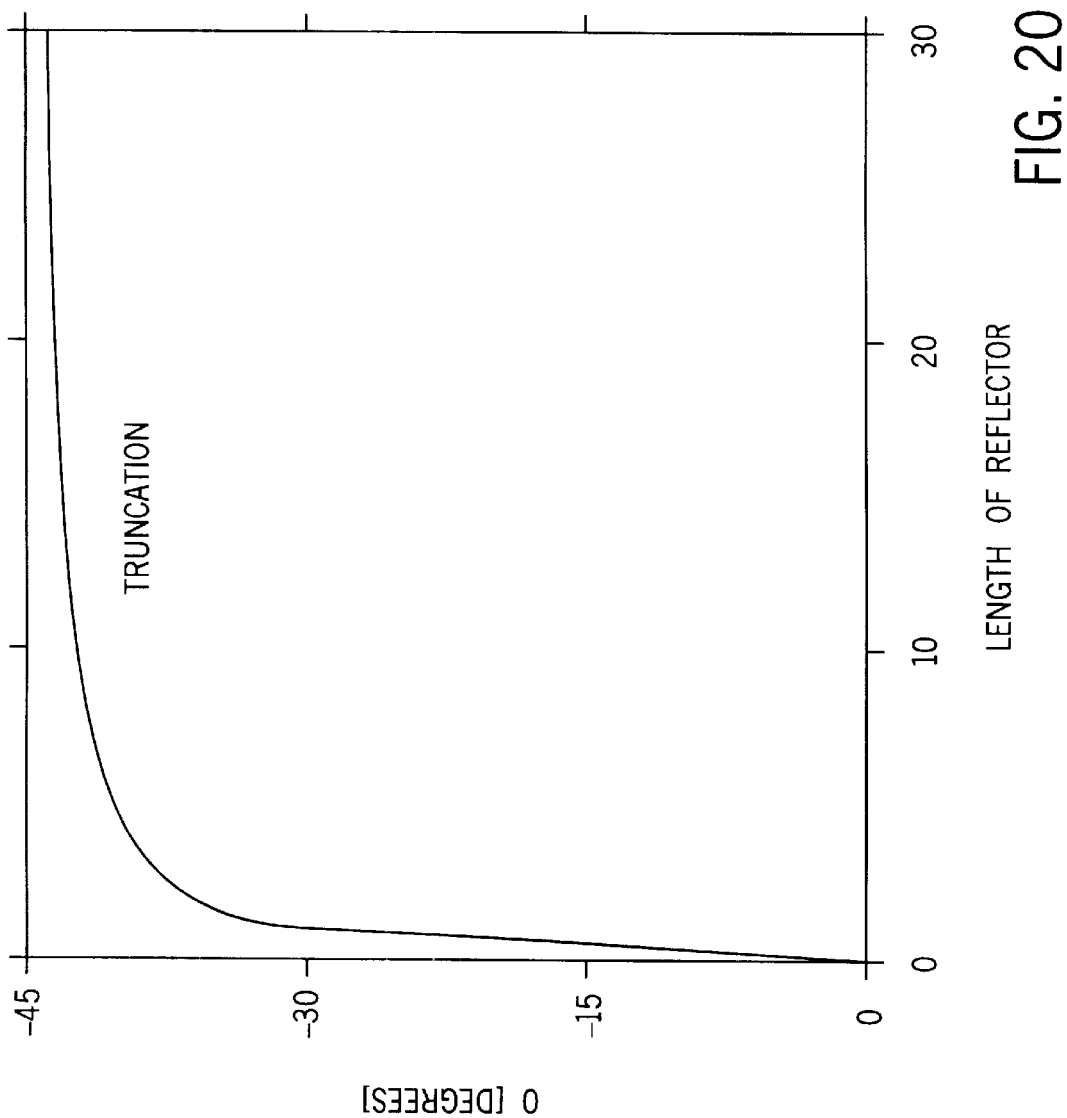
FIG. 20 shows the effect of truncation indicated by the angle up to which the truncated device matches the desired power distribution, and plotted as a function of the vertical length of the reflector.

As mentioned before, in general the reflector is of infinite size. Truncation alters, however, only the distribution in the outer parts. To illustrate the effects of truncation for the reflector of this example, we plot in FIG. 20 the angle up to which the truncated device matches the desired power distribution as a function of the vertical length of the reflector. Thus, for example, the truncated device shown in FIG. 17 has the irradiance distribution and power distribution shown in broken line in FIG. 14 and FIG. 15. Note that the reflector truncated to a vertical length of 3 times the source width covers more than ⅚ of the angular range.

B. General Optical Sources

Figure 6A:
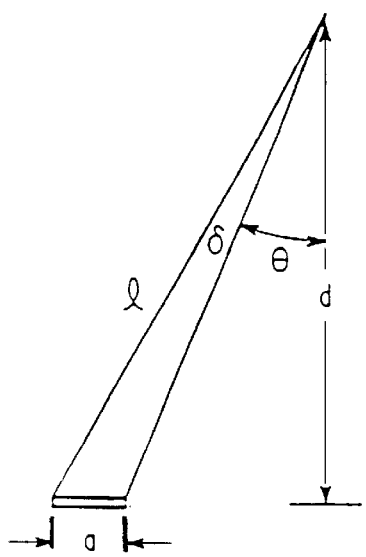
FIG. 6A shows a schematic of a two-dimensional Lambertian source giving a $\cos^3 r$ illuminance distribution.
Figure 6D:
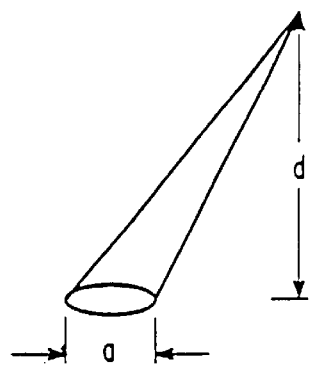
FIG. 6D illustrates a three-dimensional Lambertian source giving a $\cos^4 r$ illuminance distribution.

Non-imaging illumination can also be provided by general optical sources, provided that the geometrical constraints on a reflector can be defined by simultaneously solving a pair of system. The previously recited Eqs.(1) and (2) relate the source angle and the angle of light reflection from a reflector surface, $$d/d\Phi(\log R_i)=\tan(\Phi_i-\theta)/2,$$

and the second general expression of far-field illuminance is, $$L(\theta_i) \cdot R_i \sin(\Phi_i-\theta_i)G(\theta_i)=I(\theta_i),$$

where $L(\theta_i)$ is the characteristic luminance at angle $\theta_i$, and $G(\theta_i)$ is a geometrical factor which is a function of the geometry of the light source. In the case of a two-dimensional Lambertian light source, as illustrated in FIG. 6A, the throughput versus angle for constant illuminance varies as $\cos^3 \theta$. For a three-dimensional Lambertian light source, as shown in FIG. 6D, the throughput versus angle for constant illuminance varies as $\cos^3 \theta$.

Figure 6C:
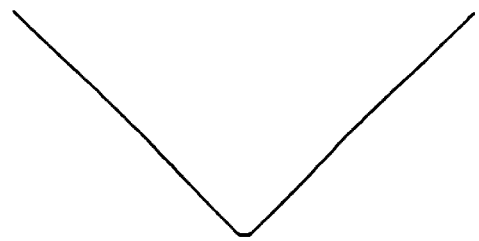
FIG. 6C illustrates the geometry of a non-imaging reflector providing uniform illuminance to r=40° for the source of FIG. 6A.
Figure 6B:
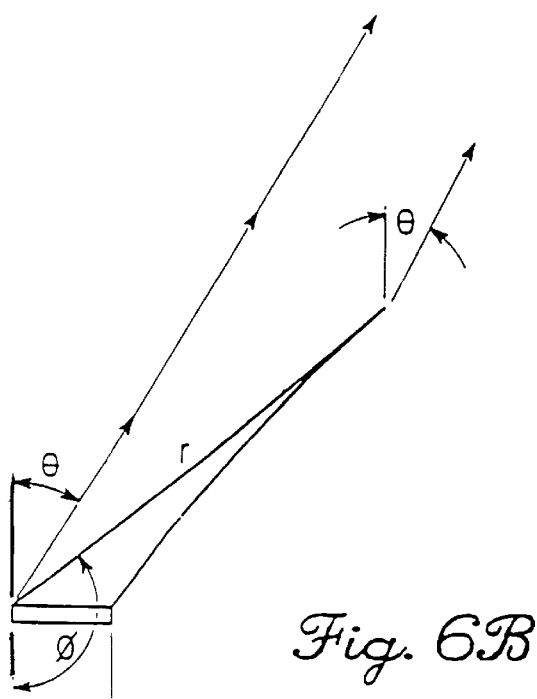
FIG. 6B shows a planar light source with the Lambertian source of FIG. 6A.

Considering the example of a two-dimensional Lambertian light source and the planar source illustrated in FIG. 6B, the concept of using a general light source to produce a selected far field illuminance can readily be illustrated. Notice with our sign convention, angle $\theta$ in FIG. 6B is negative. We solve Eqs.(18) and (19) simultaneously for a uniform far field illuminance using the two-dimensional Lambertian source. In this example, Eq.(19) becomes, $$R_i \sin(\Phi^i-\theta_i)\cos^2 \theta_i=I(\theta_i).$$

Generally, for a bare two-dimensional Lambertian source, $I(\theta_i) \equiv \delta\cos \theta_i,$ $\delta \equiv a \cos \theta_i/l,$ and $l \equiv d/\cos \theta.$ Therefore, $I \equiv \cos^3 \theta.$ In the case of selecting a uniform far-field illuminance, $I(\theta_i)=C$, if we solve the equations at the end of the first paragraph of Section B, $d/d\Phi(\log R_i)=\tan(\Phi_i-\theta_i)/2$, and $\log R_i + \log \sin(\Phi_i-\theta_i) + 2\log\cos\theta_i = \log C = $ constant, solving $d\Phi_i/d\theta_i = -2\tan\theta_i \sin(\Phi_i-\theta_i) - \cos(\Phi_i-\theta_i)$, or letting $\Psi_i = \Phi_i - \theta_i$, $d\Psi_i/d\theta_i = 1 + \sin\Psi_i - 2\tan\theta_i \cos\Psi_i$.

Solving numerically by conventional methods, such as the Runge-Kutta method, starting at $\Psi_i=0$ at $\theta_i$, for the constant illuminance, $d\Psi_i/d\theta_i = 1 + \sin\Psi_i - n\tan\theta_i \cos\Psi_i$, where n=2 for the two-dimensional source.

Figure 7A:
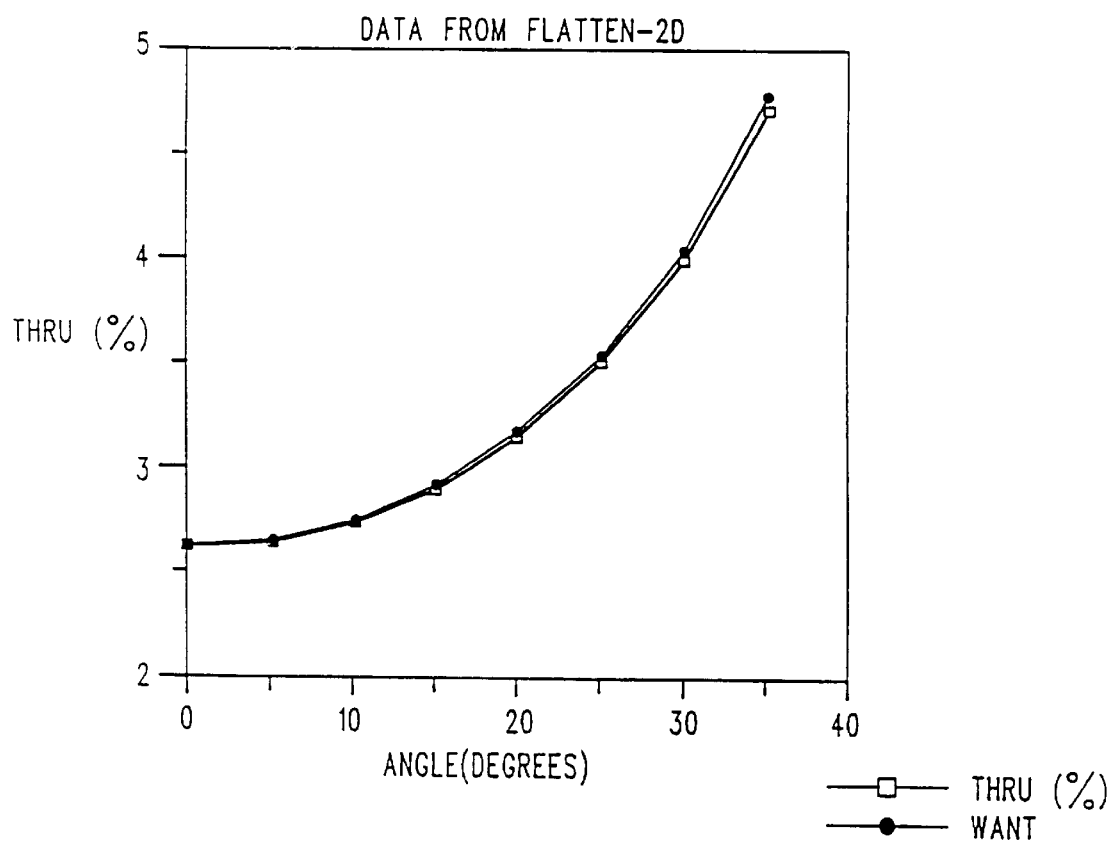
FIG. 7A shows a two-dimensional solution of a ray-trace analysis.

The resulting reflector profile for the two-dimensional solution is shown in FIG. 6C and the tabulated data characteristic of FIG. 6C is shown in Table III. The substantially exact nature of the two-dimensional solution is clearly shown in the ray-trace fit of FIG. 7A. The computer program used to perform these selective calculations is included as an Appendix. For a bare three-dimensional Lambertian source $I(\theta_i) \approx \cos^4 \theta_i$, $2 < n < 3$.

Figure 7B:
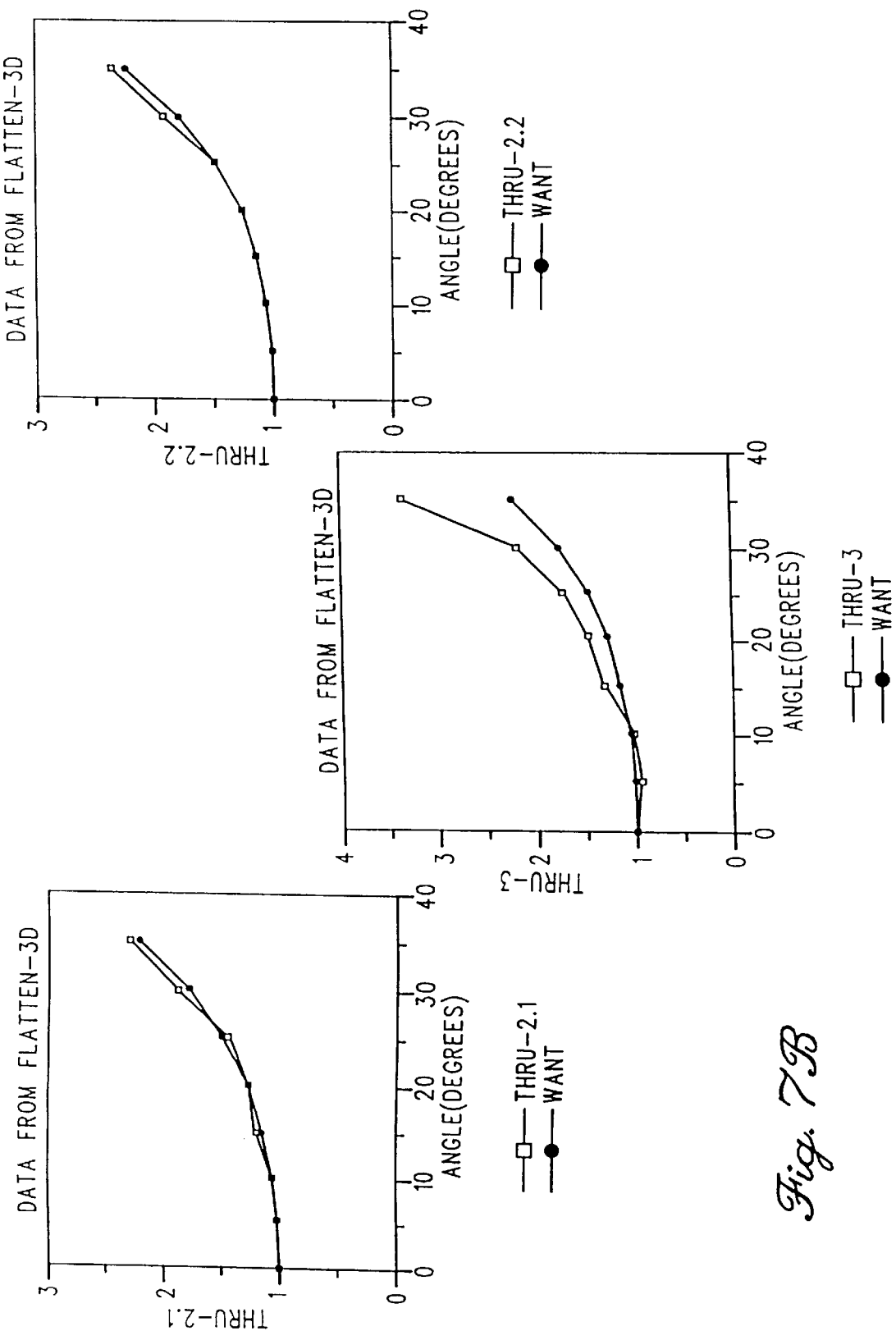
FIG. 7B illustrates three empirical fits to the three-dimensional solution.

The ray-trace fit for this three-dimensional solution is shown in FIG. 7B where the "n" value was fitted for desired end result of uniform far-field illuminance with the best fit being about n=2.1.

Other general examples for different illuminance sources include:

(1) $I(\theta_i) = A \exp(B\theta_i)$ for a two-dimensional exponential illuminance for which one must solve the equation, $d\Psi_i/d\theta_i = 1 + \sin\Psi_i - 2\tan\theta_i \cos\Psi_i + B$;

and (2) $I(\theta_i) A \exp(-B\theta_i^2/2)$ for a two-dimensional solution for a Gaussian illuminance for which one must solve, $d\Psi_i/d\theta_i = 1 + \sin\Psi_i - 2\tan\theta_i \cos\Psi_i - B\theta_i$.

The equations in the first paragraph of Section B can of course be generalized to include any light source for any desired for field illuminance for which one of ordinary skill in the art would be able to obtain convergent solutions in a conventional manner.

A ray trace of the uniform beam profile for the optical device of FIG. 1 is shown in a tabular form of output in Table II below:

TABLE III

| Φ | θ | r |
|---|---|---|
| 90.0000 | 0.000000 | 1.00526 |
| 90.3015 | 0.298447 | 1.01061 |
| 90.6030 | 0.593856 | 1.01604 |
| 90.9045 | 0.886328 | 1.02156 |
| 91.2060 | 1.17596 | 1.02717 |
| 91.5075 | 1.46284 | 1.03286 |
| 91.8090 | 1.74706 | 1.03865 |
| 92.1106 | 2.02870 | 1.04453 |
| 92.4121 | 2.30784 | 1.05050 |
| 92.7136 | 2.58456 | 1.05657 |
| 93.0151 | 2.85894 | 1.06273 |
| 93.3166 | 3.13105 | 1.06899 |
| 93.6181 | 3.40095 | 1.07536 |
| 93.9196 | 3.66872 | 1.08182 |
| 94.2211 | 3.93441 | 1.08840 |
| 94.5226 | 4.19810 | 1.09507 |
| 94.8241 | 4.45983 | 1.10186 |
| 95.1256 | 4.71967 | 1.10876 |
| 95.4271 | 4.97767 | 1.11576 |
| 95.7286 | 5.23389 | 1.12289 |
| 96.0302 | 5.48838 | 1.13013 |
| 96.3317 | 5.74120 | 1.13749 |
| 96.6332 | 5.99238 | 1.14497 |
| 96.9347 | 6.24197 | 1.15258 |
| 97.2362 | 6.49004 | 1.16031 |
| 97.5377 | 6.73661 | 1.16817 |
| 97.8392 | 6.98173 | 1.17617 |
| 98.1407 | 7.22545 | 1.18430 |
| 98.4422 | 7.46780 | 1.19256 |
| 98.7437 | 7.70883 | 1.20097 |
| 99.0452 | 7.94857 | 1.20952 |
| 99.3467 | 8.18707 | 1.21822 |
| 99.6482 | 8.42436 | 1.22707 |
| 99.9498 | 8.66048 | 1.23607 |
| 100.251 | 8.89545 | 1.24522 |
| 100.553 | 9.12933 | 1.25454 |
| 100.854 | 9.36213 | 1.26402 |
| 101.156 | 9.59390 | 1.27367 |
| 101.457 | 9.82466 | 1.28349 |
| 101.759 | 10.0545 | 1.29349 |
| 102.060 | 10.2833 | 1.30366 |
| 102.362 | 10.5112 | 1.31402 |
| 102.663 | 10.7383 | 1.32457 |
| 102.965 | 10.9645 | 1.33530 |
| 103.266 | 11.1899 | 1.34624 |
| 103.568 | 11.4145 | 1.35738 |
| 103.869 | 11.6383 | 1.36873 |
| 104.171 | 11.8614 | 1.38028 |
| 104.472 | 12.0837 | 1.39206 |
| 104.774 | 12.3054 | 1.40406 |
| 105.075 | 12.5264 | 1.41629 |
| 105.377 | 12.7468 | 1.42875 |
| 105.678 | 12.9665 | 1.44145 |

TABLE II

| 114 | 202 | 309 | 368 | 422 | 434 | 424 | 608 | 457 | 448 | 400 | 402 | 315 | 229 | 103 |
|---|---|---|---|---|---|---|---|---|---|---|---|---|---|---|
| 145 | 295 | 398 | 455 | 490 | 576 | 615 | 699 | 559 | 568 | 511 | 478 | 389 | 298 | 126 |
| 153 | 334 | 386 | 465 | 515 | 572 | 552 | 622 | 597 | 571 | 540 | 479 | 396 | 306 | 190 |
| 202 | 352 | 393 | 452 | 502 | 521 | 544 | 616 | 629 | 486 | 520 | 432 | 423 | 352 | 230 |
| 197 | 362 | 409 | 496 | 496 | 514 | 576 | 511 | 549 | 508 | 476 | 432 | 455 | 335 | 201 |
| 241 | 377 | 419 | 438 | 489 | 480 | 557 | 567 | 494 | 474 | 482 | 459 | 421 | 379 | 230 |
| 251 | 364 | 434 | 444 | 487 | 550 | 503 | 558 | 567 | 514 | 500 | 438 | 426 | 358 | 231 |
| 243 | 376 | 441 | 436 | 510 | 526 | 520 | 540 | 540 | 482 | 506 | 429 | 447 | 378 | 234 |
| 233 | 389 | 452 | 430 | 489 | 519 | 541 | 547 | 517 | 500 | 476 | 427 | 442 | 344 | 230 |
| 228 | 369 | 416 | 490 | 522 | 501 | 539 | 546 | 527 | 481 | 499 | 431 | 416 | 347 | 227 |
| 224 | 359 | 424 | 466 | 493 | 560 | 575 | 553 | 521 | 527 | 526 | 413 | 417 | 320 | 205 |
| 181 | 378 | 392 | 489 | 485 | 504 | 603 | 583 | 563 | 530 | 512 | 422 | 358 | 308 | 194 |
| 150 | 326 | 407 | 435 | 506 | 567 | 602 | 648 | 581 | 535 | 491 | 453 | 414 | 324 | 179 |
| 135 | 265 | 382 | 450 | 541 | 611 | 567 | 654 | 611 | 522 | 568 | 446 | 389 | 300 | 130 |
| 129 | 213 | 295 | 364 | 396 | 404 | 420 | 557 | 469 | 435 | 447 | 351 | 287 | 206 | 146 |

ELEVATION

TABLE III-continued

| Φ | θ | r |
|---|---|---|
| 105.980 | 13.1857 | 1.45441 |
| 106.281 | 13.4043 | 1.46761 |
| 107.789 | 14.4898 | 1.48108 |
| 108.090 | 14.7056 | 1.53770 |
| 108.392 | 14.9209 | 1.55259 |
| 108.693 | 15.1359 | 1.56778 |
| 108.995 | 15.3506 | 1.58329 |
| 109.296 | 15.5649 | 1.59912 |
| 109.598 | 15.7788 | 1.61529 |
| 109.899 | 15.9926 | 1.63181 |
| 110.201 | 16.2060 | 1.64868 |
| 110.503 | 16.4192 | 1.66591 |
| 110.804 | 16.6322 | 1.68353 |
| 111.106 | 16.8450 | 1.70153 |
| 111.407 | 17.0576 | 1.71994 |
| 111.709 | 17.2701 | 1.73876 |
| 112.010 | 17.4824 | 1.75801 |
| 112.312 | 17.6946 | 1.77770 |
| 112.613 | 17.9068 | 1.79784 |
| 112.915 | 18.1188 | 1.81846 |
| 113.216 | 18.3309 | 1.83956 |
| 113.518 | 18.5429 | 1.86117 |
| 113.819 | 18.7549 | 1.88330 |
| 114.121 | 18.9670 | 1.90596 |
| 114.422 | 19.1790 | 1.92919 |
| 114.724 | 19.3912 | 1.95299 |
| 115.025 | 19.6034 | 1.97738 |
| 115.327 | 19.8158 | 2.00240 |
| 115.628 | 20.0283 | 2.02806 |
| 115.930 | 20.2410 | 2.05438 |
| 116.231 | 20.4538 | 2.08140 |
| 116.533 | 20.6669 | 2.10913 |
| 116.834 | 20.8802 | 2.13761 |
| 117.136 | 21.0938 | 2.16686 |
| 117.437 | 21.3076 | 2.19692 |
| 117.739 | 21.5218 | 2.22782 |
| 118.040 | 21.7362 | 2.25959 |
| 118.342 | 21.9511 | 2.29226 |
| 118.643 | 22.1663 | 2.32588 |
| 118.945 | 22.3820 | 2.36049 |
| 119.246 | 22.5981 | 2.39612 |
| 119.548 | 22.8146 | 2.43283 |
| 119.849 | 23.0317 | 2.47066 |
| 120.151 | 23.2493 | 2.50967 |
| 120.452 | 23.4674 | 2.54989 |
| 120.754 | 23.6861 | 2.59140 |
| 121.055 | 23.9055 | 2.63426 |
| 121.357 | 24.1255 | 2.67852 |
| 121.658 | 24.3462 | 2.72426 |
| 121.960 | 24.5676 | 2.77155 |
| 122.261 | 24.7898 | 2.82046 |
| 122.563 | 25.0127 | 2.87109 |
| 122.864 | 25.2365 | 2.92352 |
| 123.166 | 25.4611 | 2.97785 |
| 123.467 | 25.6866 | 3.03417 |
| 123.769 | 25.9131 | 3.09261 |
| 124.070 | 26.1406 | 3.15328 |
| 124.372 | 26.3691 | 3.21631 |
| 124.673 | 26.5986 | 3.28183 |
| 124.975 | 26.8293 | 3.34999 |
| 125.276 | 27.0611 | 3.42097 |
| 125.578 | 27.2941 | 3.49492 |
| 125.879 | 27.5284 | 3.57205 |
| 126.181 | 27.7640 | 3.65255 |
| 126.482 | 28.0010 | 3.73666 |
| 126.784 | 28.2394 | 3.82462 |
| 127.085 | 28.4793 | 3.91669 |
| 127.387 | 28.7208 | 4.01318 |
| 127.688 | 28.9638 | 4.11439 |
| 127.990 | 29.2086 | 4.22071 |
| 128.291 | 29.4551 | 4.33250 |
| 128.593 | 29.7034 | 4.45022 |
| 128.894 | 29.9536 | 4.57434 |
| 129.196 | 30.2059 | 4.70540 |
| 129.497 | 30.4602 | 4.84400 |
| 129.799 | 30.7166 | 4.99082 |
| 130.101 | 30.9753 | 5.14662 |

TABLE III-continued

| Φ | θ | r |
|---|---|---|
| 130.402 | 31.2365 | 5.31223 |
| 130.704 | 31.5000 | 5.48865 |
| 131.005 | 31.7662 | 5.67695 |
| 131.307 | 32.0351 | 5.87841 |
| 131.608 | 32.3068 | 6.09446 |
| 131.910 | 32.5815 | 6.32678 |
| 132.211 | 32.8593 | 6.57729 |
| 132.513 | 33.1405 | 6.84827 |
| 132.814 | 33.4251 | 7.14236 |
| 133.116 | 33.7133 | 7.46272 |
| 133.417 | 34.0054 | 7.81311 |
| 133.719 | 34.3015 | 8.19804 |
| 134.020 | 34.6019 | 8.62303 |
| 134.322 | 34.9068 | 9.09483 |
| 134.623 | 35.2165 | 9.62185 |
| 134.925 | 35.5314 | 10.2147 |
| 135.226 | 35.8517 | 10.8869 |
| 135.528 | 36.1777 | 11.6561 |
| 135.829 | 36.5100 | 12.5458 |
| 136.131 | 36.8489 | 13.5877 |
| 136.432 | 37.1949 | 14.8263 |
| 136.734 | 37.5486 | 16.3258 |
| 137.035 | 37.9106 | 18.1823 |
| 137.337 | 38.2816 | 20.5479 |
| 137.638 | 38.6625 | 23.6778 |
| 137.940 | 39.0541 | 28.0400 |
| 138.241 | 39.4575 | 34.5999 |
| 138.543 | 39.8741 | 45.7493 |
| 138.844 | 40.3052 | 69.6401 |
| 139.146 | 40.7528 | 166.255 |
| 139.447 | 41.2190 | 0.707177E-01 |
| 139.749 | 41.7065 | 0.336171E-01 |
| 140.050 | 42.2188 | 0.231080E-01 |
| 140.352 | 42.7602 | 0.180268E-01 |
| 140.653 | 43.3369 | 0.149969E-01 |
| 140.955 | 43.9570 | 0.129737E-01 |
| 141.256 | 44.6325 | 0.115240E-01 |
| 141.558 | 45.3823 | 0.104348E-01 |
| 141.859 | 46.2390 | 0.958897E-02 |
| 142.161 | 47.2696 | 0.891727E-02 |
| 142.462 | 48.6680 | 0.837711E-02 |
| 142.764 | 50.0816 | 0.794451E-02 |
| 143.065 | 48.3934 | 0.758754E-02 |
| 143.367 | 51.5651 | 0.720659E-02 |
| 143.668 | 51.8064 | 0.692710E-02 |
| 143.970 | 56.1867 | 0.666772E-02 |
| 144.271 | 55.4713 | 0.647559E-02 |
| 144.573 | 54.6692 | 0.628510E-02 |
| 144.874 | 53.7388 | 0.609541E-02 |
| 145.176 | 52.5882 | 0.590526E-02 |
| 145.477 | 50.8865 | 0.571231E-02 |
| 145.779 | 53.2187 | 0.550987E-02 |
| 146.080 | 52.1367 | 0.534145E-02 |
| 146.382 | 50.6650 | 0.517122E-02 |
| 146.683 | 49.5225 | 0.499521E-02 |
| 146.985 | 45.6312 | 0.481649E-02 |
| 147.286 | 56.2858 | 0.459624E-02 |
| 147.588 | 55.8215 | 0.448306E-02 |
| 147.889 | 55.3389 | 0.437190E-02 |
| 148.191 | 54.8358 | 0.426265E-02 |
| 148.492 | 54.3093 | 0.415518E-02 |
| 148.794 | 53.7560 | 0.404938E-02 |
| 149.095 | 53.1715 | 0.394512E-02 |
| 149.397 | 52.5498 | 0.384224E-02 |
|  |  | 0.374057E-02 |

C. Extended Finite-Sized Sources

In this section we demonstrate how compact CEC reflectors can be designed to produce a desired irradiance distribution on a given target space from a given finite-sized source. The method is based on tailoring the reflector to a family of edge-rays, but at the same time the edge rays of the reflected source image are also controlled.

In order to tailor edge rays in two dimensions, for example, one can assume a family of edge rays, such as are produced by a luminaire source. Through each point in the space outside the lumninaire source there is precisely one edge ray. The direction of the edge rays is a continuous and differentiable vector function of position. If we have a second tentative family of edge rays represented by another continuous vector function in the same region of space, we can design a reflector which precisely reflects one family onto the other. Each point in space is the intersection of precisely one member of each family. Therefore, the inclination of the desired reflector in each point in space can be calculated in a conventional, well known manner. Thus, one can derive a differential equation which uniquely specifies the reflector once the starting point is chosen.

We can, for example, formalize this idea for the case where the tentative family of edge rays is given only along a reference line which is not necessarily a straight line. This pertains to the usual problems encountered in solving illumination requirements.

Figure 21:
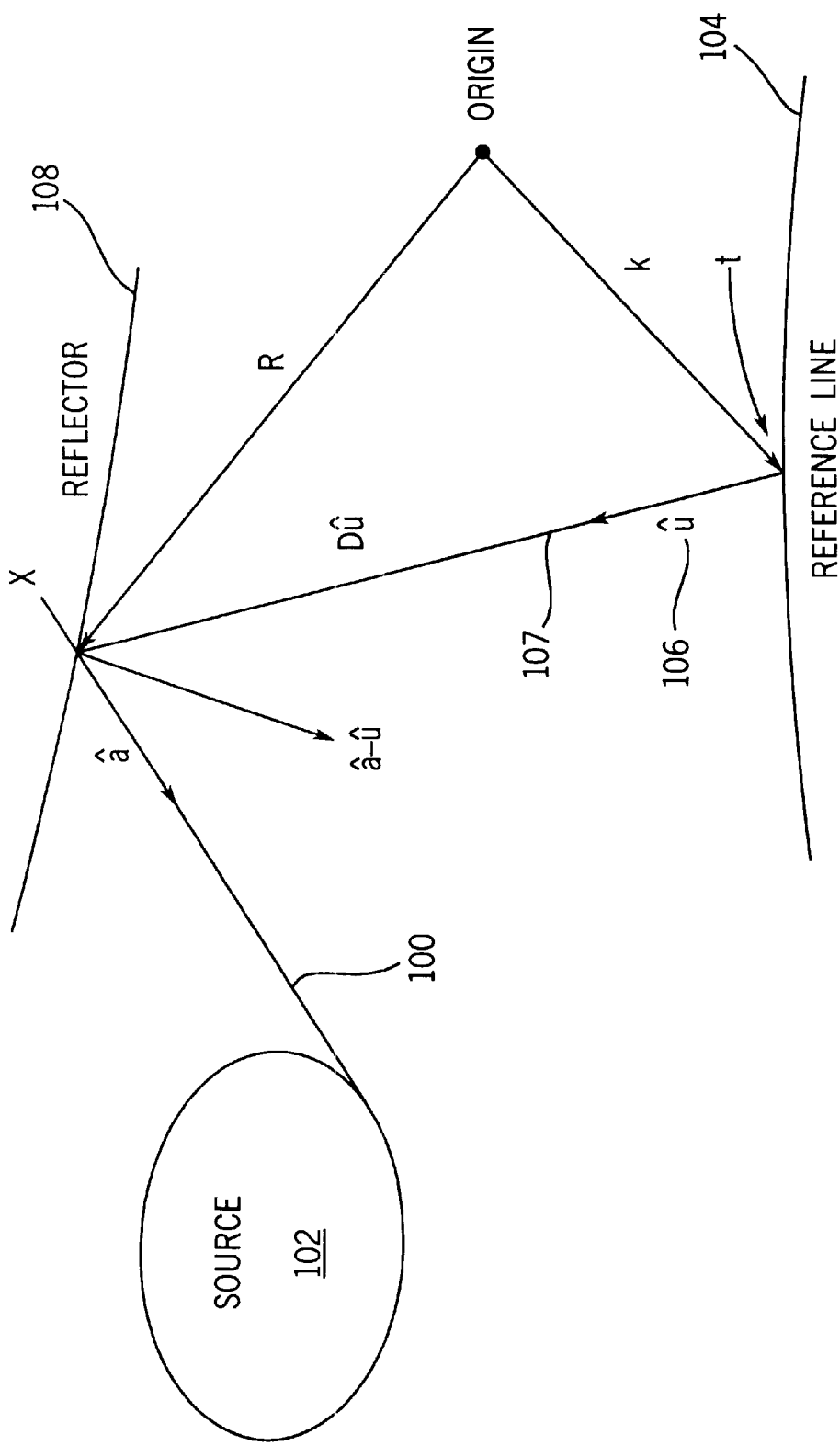
FIG. 21 illustrates a light source and family of edge rays along a reference line with identifying vectors.

Referring to FIG. 21, let a=a(x) be the two-dimensional unit vector 100 pointing toward the edge of a source 102 as seen from a point x, where k=k(t) is a parameterization of reference line 104 according to a scalar parameter t. Let u(t) be a unit vector 106 pointing in the direction of an edge ray 107 desired at the reference location specified by t. We can parameterize the contour of a reflector 108 with respect to the reference line 104 by writing the points on the reflector 108 as, $$R(t)=k(t)+Du(t). \tag{35}$$

Here the scalar D denotes the distance from a point on the reference line 104 to the reflector 108 along the desired edge ray 107 through this point.

Designing the shape of the reflector 108 in this notation is equivalent to specifying the scalar function D=D(t). An equation for D is derived from the condition that the reflector 108 should reflect the desired edge ray 107 along u(t) into the actual edge ray a(R(t)) and vice versa, $$\frac{dR(t)}{dt} \text{ is perpendicular to } (a(R(t)) - u(t)). \tag{36}$$

Inserting Eq. (35) from above yields, $$\frac{dD}{dt} = \frac{dk/dt \cdot (a-u) + D(du/dt) - a}{(1-a) \cdot u}. \tag{37}$$

Here the dots indicate scalar products. Eq.(37) is a scalar differential equation for the scalar function D(t). By solving this equation, we can determine the reflector 108 which tailors the desired family of the edge ray 107 specified by the unit vector 106, u, to the source 102 characterized by the vector function, a.

This approach can also be used to tailor one family of the edge rays 107 onto another with refractive materials rather then reflectors. Eq.(36) then is replaced by Snell's law.

Consequently, the condition for the existence of a solution in this embodiment is that each point on the reflector 108 is intersected by precisely one member of the family of tentative edge rays. To be able to define this family of edge rays 107 along the reference line 104, each point on the reference line 104 must also be intersected by precisely one tentative edge ray. This is less than the requirement that the tentative edge rays define a physical surface which produces them. The family of the edge rays 107 of a physical contour (for example right edge rays) must also satisfy the further requirement that precisely one edge ray passes through each point of the entire space exterior to the contour. Indeed we can produce families of such edge rays by tailoring, but which cannot be produced by a single physical source. This is confirmed by observations that curved mirrors produce not only a distorted image of the source, but furthermore an image is produced that appears to move as the observer moves.

The condition that each point on the reflector 108, as well as each point on the reference line 104, should be intersected by precisely one of the desired edge rays 107 implies that the caustic formed by these edge rays 107 cannot intersect the reflector 108 or the reference line 104. The caustic is defined to be the line of tangents to the rays. The caustic must therefore either be entirely confined to the region between the reflector 108 and the reference line 104, or lie entirely outside this region. The first of these alternatives characterizes the CEC-type solutions, while the second one defines CHC-type solutions.

In order to determine the desired edge rays 107, the irradiance, for example, from a Lambertian source of uniform brightness B is given by its projected solid angle or view factor. In a conventional, known manner the view factor is calculated by projecting the source 102 first on a unit sphere surrounding the observer (this yields the solid angle) and then projecting the source 102 again onto the unit circle tangent to the reference plane. The view factor is determined by the contour of the source 102 as seen by the observer. In two dimensions for example, the irradiance E is, $$E=B(\sin r_R - \sin r_L), \tag{38}$$

where $r_R$ and $r_L$, are the angles between the normal to the reference line and the right and left edge rays striking the observer, respectively. If we know the brightness B, the desired irradiance E, and one edge ray, then Eq.(38) can be used to determine the desired direction of the other edge ray.

Figure 22B:
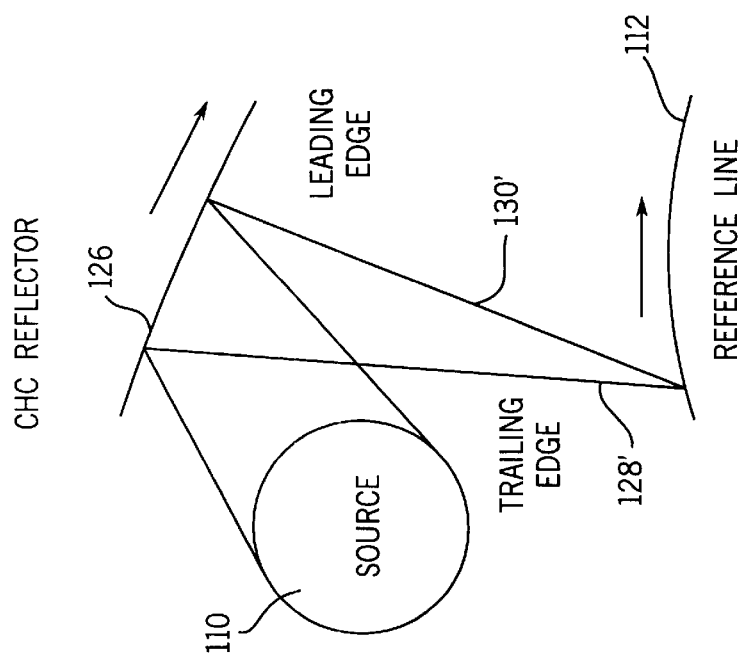
FIG. 22B illustrates a source, reflector, reference line and edge rays for a CHC reflector.

Consider the example of a source 110 of given shape (see FIG. 22). We then know the direction of the edge rays as seen by an observer as a function of the location of the observer. The shape of the source 110 can be defined by all its tangents. We can now design the reflector 108 so that it reflects a specified irradiance distribution onto the given reference line 104 iteratively.

Figure 22A:
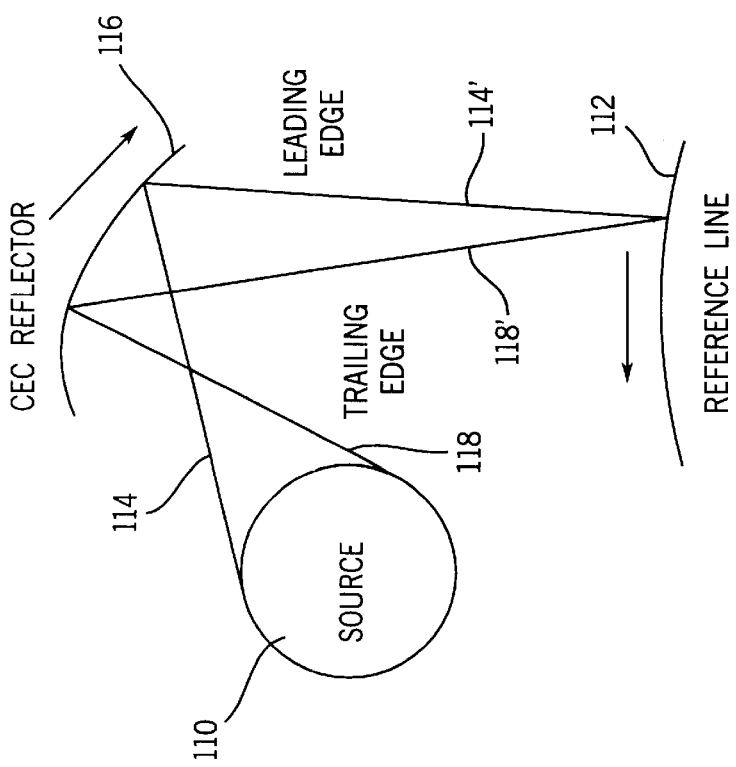
FIG. 22A illustrates a source, reflector, reference line and edge rays for a CEC reflector.

In this iterative process if an observer proceeds, for example, from right to left along reference line 112, the perceived reflection moves in the opposite direction for a CEC-type solution. As shown in FIG. 22A, a right-edge ray 114, as seen by the observer, is the reflection of the right edge, as seen from reflector 116, and further plays the role of leading edge ray 114' along the reflector 116. A left edge ray 118 is just trailing behind, and this is shown in FIG. 22A as reflected trailing edge ray 118'. For a CHC-type reflector 126 (see FIG. 22B) the reflected image of the source 110 moves in the same direction as the observer, and the right edge as seen by the observer is the reflection of the left edge. If part of the reflector 126 is known, then a trailing edge ray 128' which has been reflected by the known part of the reflector 126, can be calculated as a function of location on the reference line 112. Eq.(38) consequently specifies the direction of leading edge ray 130. Eq. (37) can then be solved to tailor the next part of the reflector profile to this leading edge ray 130. Considering the boundary conditions, if the reflector 116 or 126 is terminated, then the reflected radiation does not terminate where the leading edge from the end of the reflector 116 or 126 strikes the reference line 112. Rather, the reflected radiation ends where the trailing edge from the end of the reflector 116 or 126 strikes the reference line 112 (see FIG. 23). Thus, there is a 'decay' zone 130 on the reference line 112 which subtends an equal angle at the source 110 as seen from the end of the reflector 116 or 126. In this region the previously leading edge is at an end location 131 of the reflector 116 or 126, while the trailing edge gradually closes in. An analogous 'rise' zone 132 exists at the other end of the reflector 116 or 126, where the trailing edge is initially fixed to a 'start' position 134 of the reflector 116. However, there is an important conceptual difference between these two regions, in that the 'rise' of the irradiance can be modeled by tailoring the reflector 116 or 126 to the leading edge, while the 'decay' cannot be influenced once the reflector 116 or 126 is terminated. Therefore, there is a difference in which way we can proceed in the iterative tailoring of the reflector 116 or 126.

Figure 24:
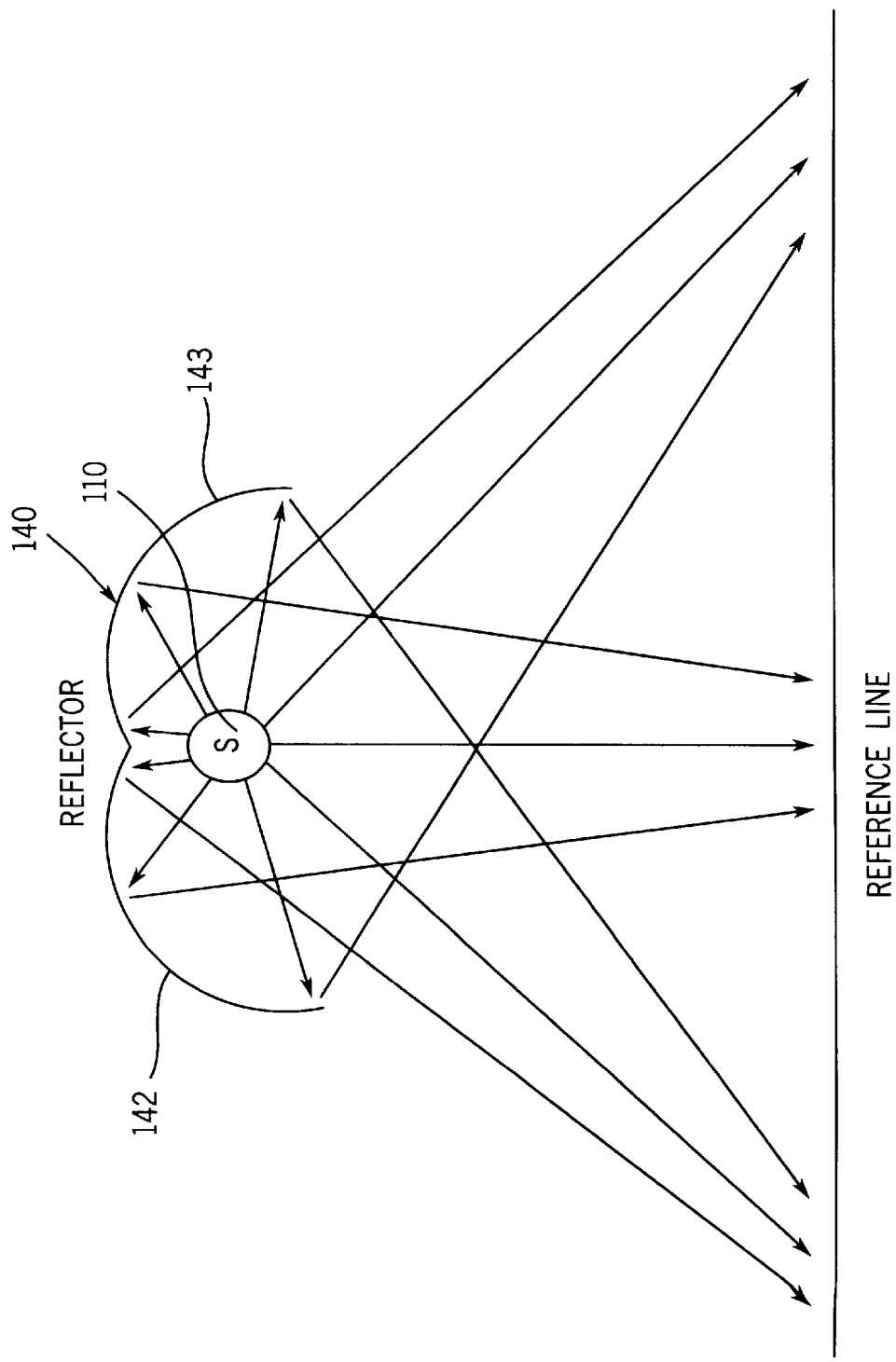
FIG. 24 shows a reflector for illumination of both sides of a target zone.

If the source 110 radiates in all directions and we want to avoid trapped radiation (that is, radiation reflected back onto the source 110), then the reflected radiation from each side of the reflector 140 should cover the whole target domain of the reflector 140 (see FIG. 24). At the same time, the normal to the reflector surface should not intersect the source 110. Therefore, left and right side portions 142 and 143, respectively, of the reflectors 140 are joined in a cusp. An observer in the target domain thus perceives radiation from two distinct reflections of the source 110, one in each of the portions 142 and 143 of the reflector 140, in addition to the direct radiation from the source 110.

If we assume symmetry as shown in FIG. 24 and assume the surface of the reflector 140 is continuous and differentiable (except for the cusp in the symmetry plane), then we require that as seen from the symmetry plane, the two perceived reflections are equal. For all other points in the target domain we now have the additional degree of freedom of choosing the relative contributions of each of the portions 142 and 143 of the reflector 140. In CEC-type solutions both reflections appear to be situated between the target space and the reflector 140. Thus, as the observer moves, both reflection images move in the opposite direction. When the observer approaches the outermost part of the illuminated target region, the reflection on the same side first disappears at the cusp in the center. Thereafter, the reflection opposite to the observer starts to disappear past the outer edge of the opposite reflector, while the source itself is shaded by the outer edge of the other reflector portion on the observer side. These events determine the end point of the reflector 140 because now the total radiation in the target region equals the total radiation emitted by the source 110.

Figure 25:
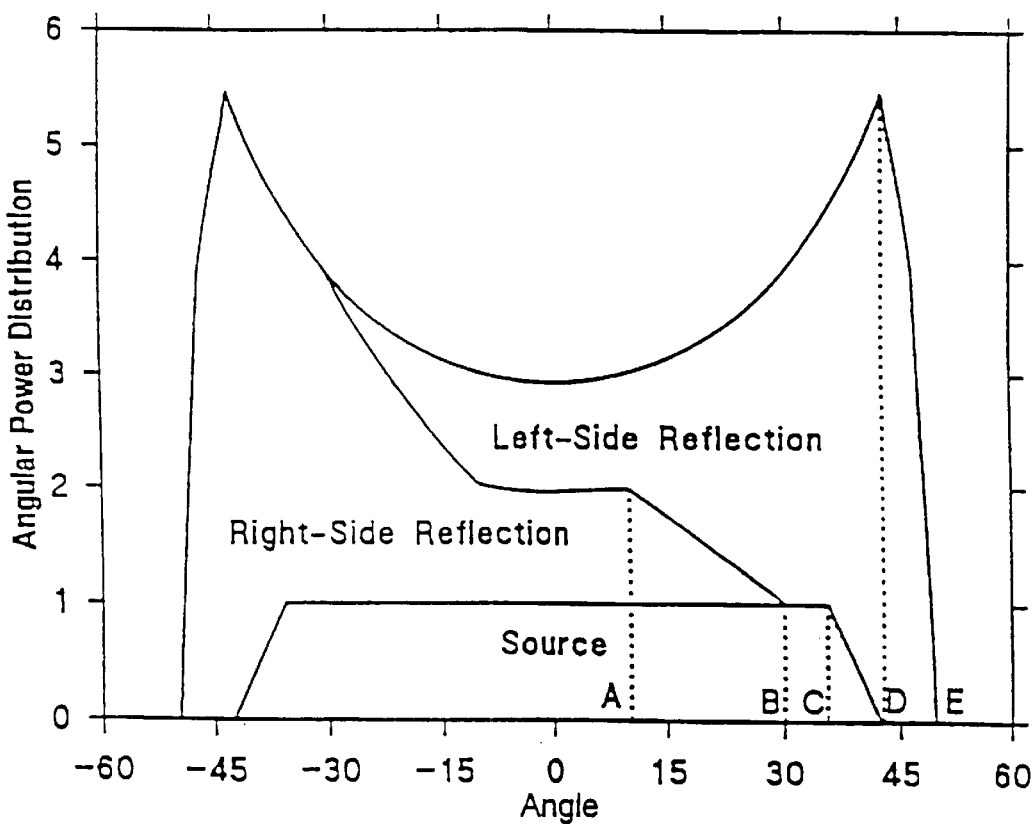
FIG. 25 shows irradiance as a function of angle on a distant plane from a finite cylindrical source of uniform brightness.
Figure 26:
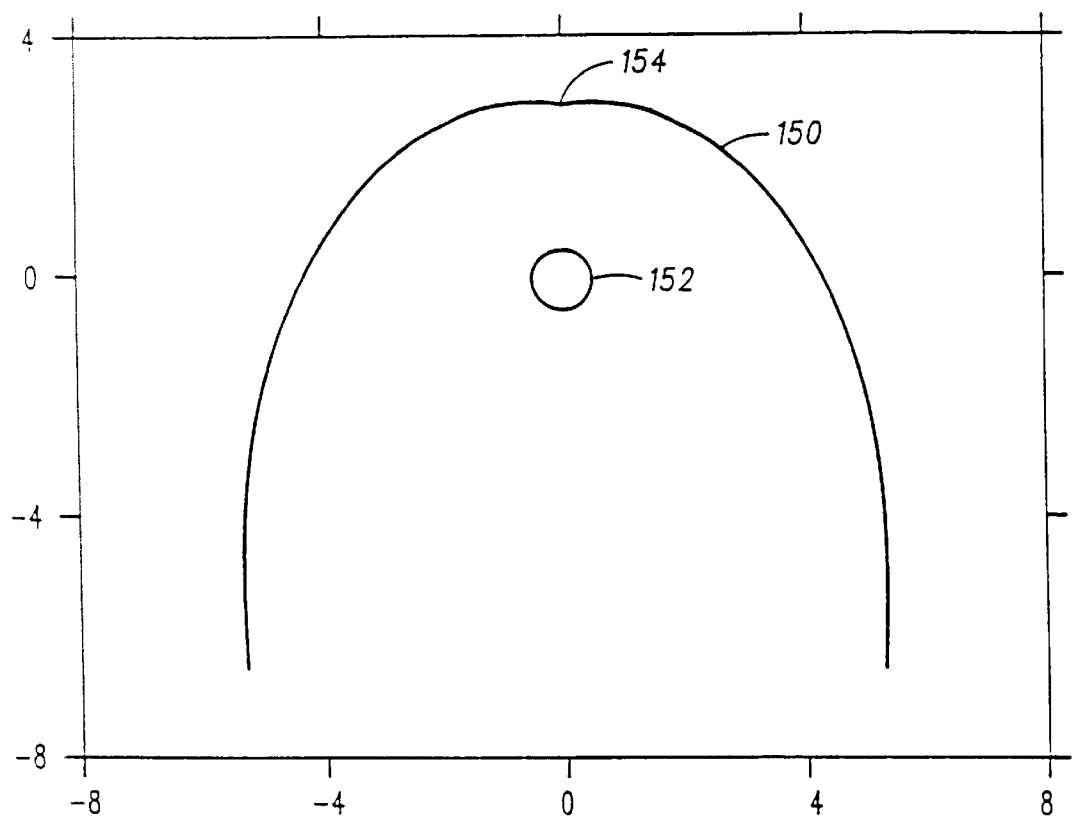
FIG. 26 shows a CEC-type reflector profile producing a constant irradiance on a distant plane from a cylindrical source.

D. CEC-Type Reflector for Constant Irradiance A CEC-type reflector 150 can produce a constant irradiance on a distant plane from a finite size cylindrical source 152 of uniform brightness. This requires the angular power distribution to be proportional to $1/\cos^2(\theta)$. In FIG. 25 we show the necessary power from both reflections so that the total power is as required. The reflector 150 is depicted in FIG. 26. The reflector 150 is designed starting from cusp 154 in the symmetry axes. Note that each reflection irradiates mostly the opposite side, but is visible from the same side too. Some angles have been particularly designated by the letters A through E in FIG. 12. The corresponding edge rays are indicated also in FIG. 27.

Between −A and +A angles the reflections are immediately adjacent to the source 152. The cusp 154 in the center is not visible. Between A and B angles the reflection from the same side as the observer slowly disappears at the cusp 154, while the other increases in size for compensation. Starting with C, the source 152 is gradually eclipsed by the end of the reflector 150. The largest angle for which a constant irradiance can be achieved is labeled D. The source 152 is not visible. The power is produced exclusively by the opposite side reflection. The reflector 150 is truncated so that between D and E the reflection gradually disappears at the end of the reflector 150.

The inner part of the reflector 150, which irradiates the same side, is somewhat arbitrary. In the example shown, we have designed it as an involute because this avoids trapped radiation and at the same time yields the most compact design. At the center the power from each reflection is very nearly equal to that of the source 152 itself. Once the power radiated to the same side is determined, the reflector 150 is designed so that the sum of the contributions of the two reflections and the source 152 matches the desired distribution. Proceeding outward, the eclipsing of the source 152 by the reflector 150 is not known at first, because it depends on the end point. This problem is solved by iterating the whole design procedure several times.

The point of truncation is determined by the criterion that the reflector 150 intersects the edge rays marked B from the cusp 154, because the preferred design is based on a maximum of one reflection. This criterion is also the reason for designing the inner part as an involute.

Figure 27:
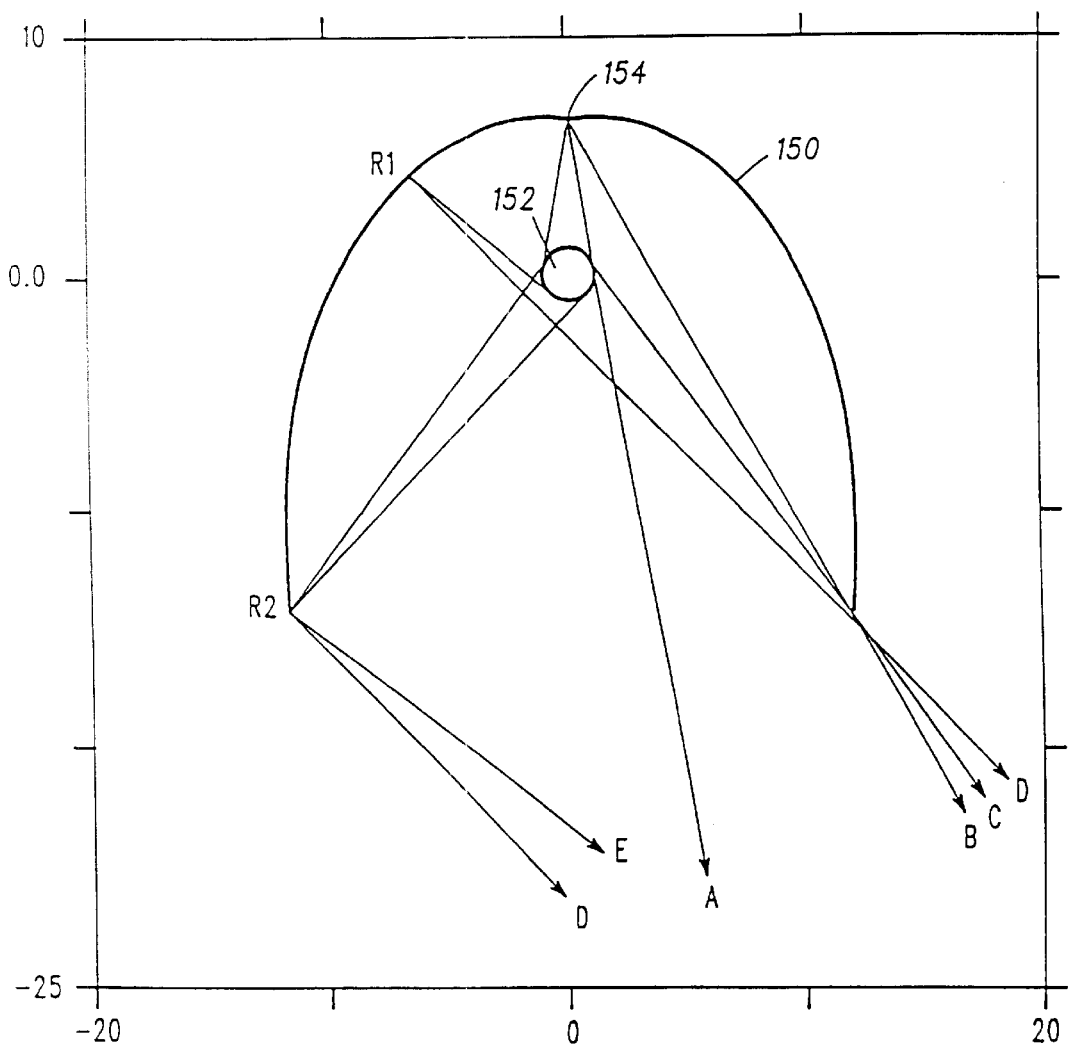
FIG. 27 shows some edge rays corresponding to the angles designated in FIG. 25.

The angular decay range D to E in FIGS. 25 and 27 depends only on the distance of the end point to the source 152. Depending on the starting distance from the cusp 154 to the source 152, the device can be designed either more compact, but with a broader decay zone, or larger, and with a more narrow decay zone. The reflector 150 shown has a cusp distance of 2.85 source diameters. The end point is at a distance of 8.5 source diameters. This ensures that a constant irradiance is produced between −43 and 43 degrees. The decay zone is only 7 degrees. This design was chosen so that the source 152 is eclipsed just before the angle of truncation.

The reflector 150 cannot be made much more compact as long as one designs for a minimum of one reflection. At the angle D the opening is nearly totally filled with radiation as seen in FIG. 27. The distance the reflector 150 extends downward from the source 152 is also determined by the maximum power required to produce at angle D. The distance of the cusp 154 also cannot be diminished, otherwise the criterion for the end of the reflection 150 is reached sooner, the reflector 150 has to be truncated and the maximum power produced is also less.

The embodiments described here involve at most one reflection. However, in other forms of the invention various systems based on multiple reflections can be designed using the teachings provided here. As more reflections contribute, the freedom of the designer increases. This freedom can be used to adapt the reflector to other criteria, such as a need for compactness. In any case, independent of the number of reflections, once the general architecture has been determined, tailoring the reflector to one set of edge rays determines its shape without the need for approximations or a need to undergo optimizations. We emphasize that in this technology total internal reflection may have an important role.

Figure 28:
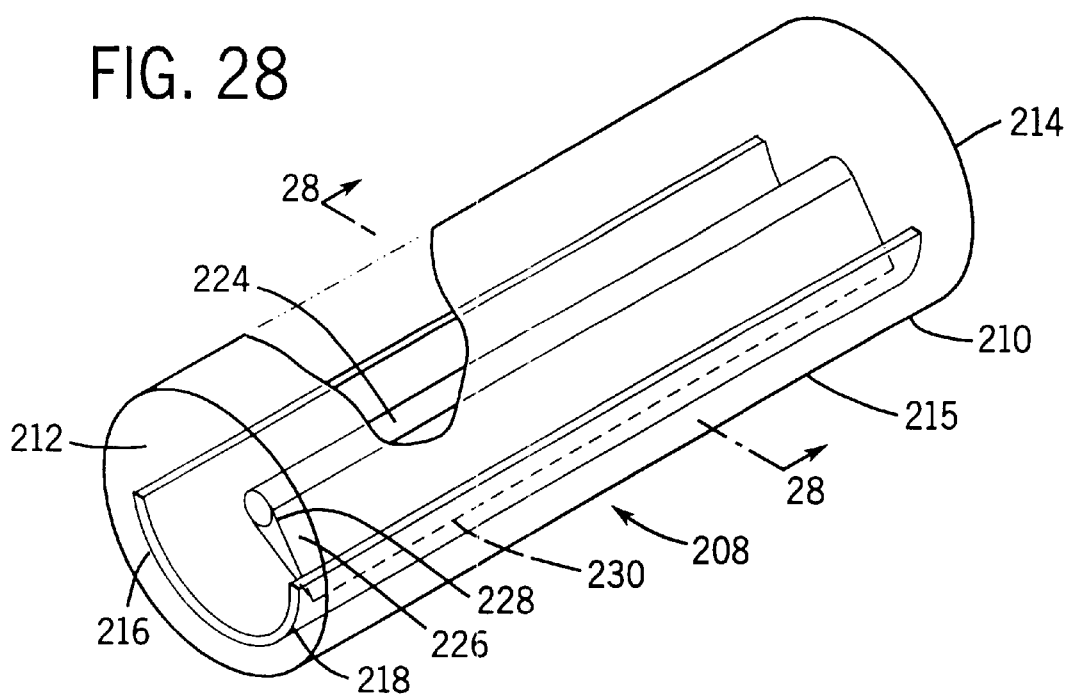
FIG. 28 is a perspective view of an apparatus for the practice of the invention.
Figure 29A:
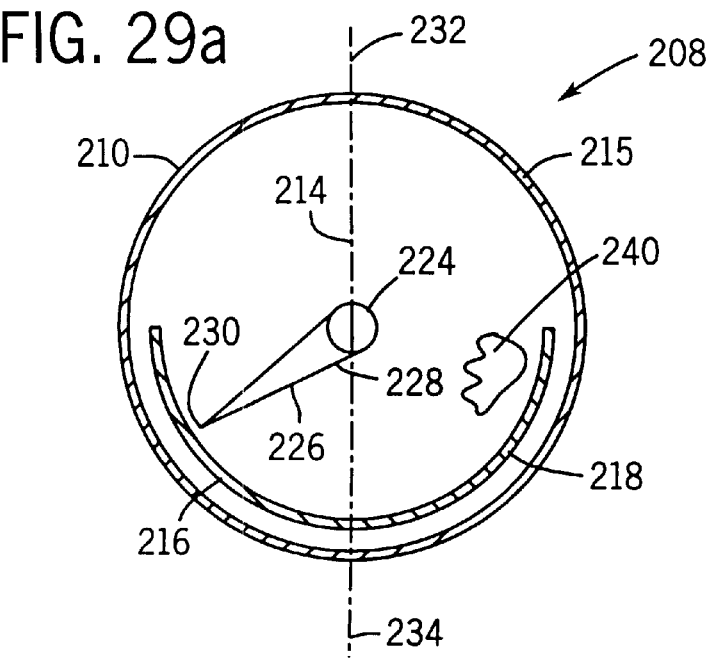
FIG. 29a is a sectional view of the apparatus of FIG. 28 taken along section lines 28—28.

FIG. 28 is a perspective view of a solar collector 208 for the practice of the invention and FIG. 29a is a sectional view of the solar collector 208 of FIG. 28 taken along section lines 28—28. In FIGS. 28 and 29a, a tube 210 is closed at a first end 212 and a second end 214 so as to permit the maintenance of a vacuum inside a housing 215 that is formed by the combination of the tube 210, the first end 212, and the second end 214. A first reflector 216 and a second reflector 218 are placed to reflect incident light onto a central tube 224. An absorber 226 is attached to the central tube 224 at a large end 228. A pointed end 230 extends to or nearly to one of the reflectors 216 or 218. The reflectors 216 and 218 are substantially on opposite sides of a center line 232 that is pointed substantially at the sun at the time when maximum intensity is desired. The tube 210 may be partly or completely transparent but will normally be partly transparent when the reflectors 216 and 218 are portions of the transparent tube 210 that are silvered or aluminized or otherwise treated to provide reflective coatings.

The reflectors 216 and 218 may also be pieces of metal shaped to a desired reflecting configuration secured in position inside the housing 215. One of the reflectors 216 and 218 may be silvered or otherwise provided with a reflective coating on the tube 210 and the other may be a shaped piece of metal.

Figure 29B:
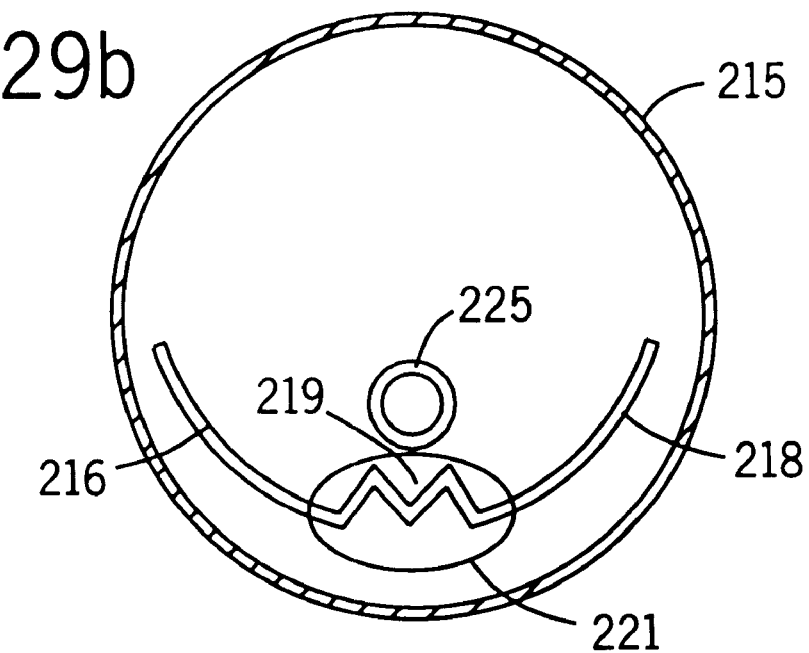
Figure 29C:
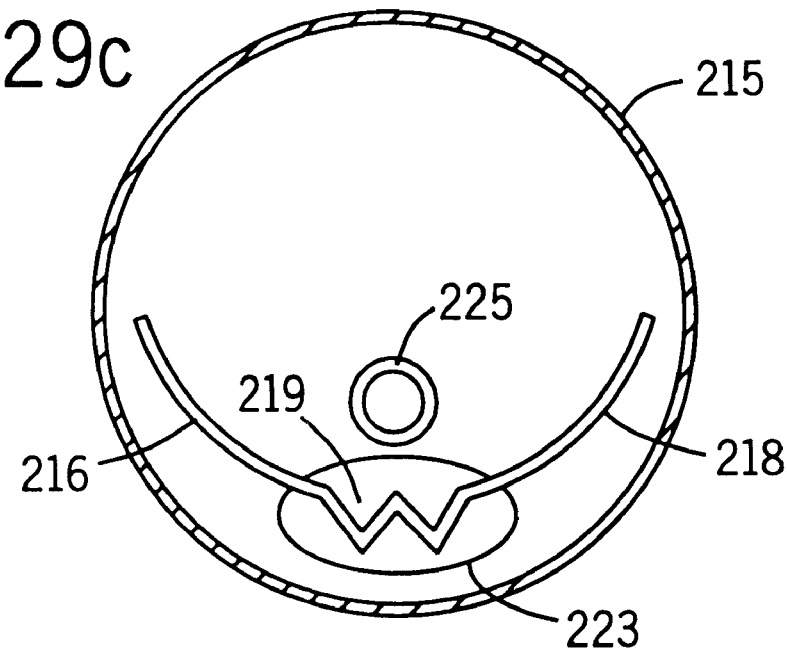
Figure 29D:
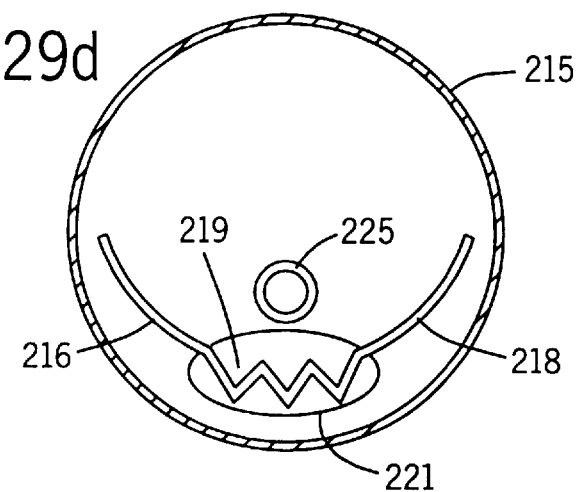
Figure 29E:
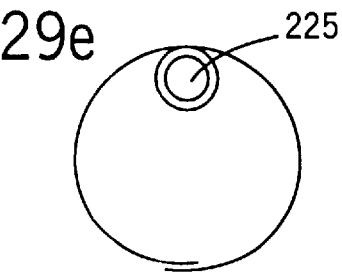
FIGS. 29e and 29f show alternate versions of the receiver 225 of FIGS. 29b, 29c, and 29d.
Figure 29F:
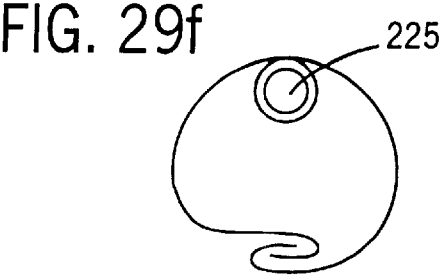

If the reflectors 216 and 218 are not sections of cylinders, as they may be, they may also be designed to curves calculated according to well-known practices. These calculations are treated in detail in some or all of U.S. Pat. Nos. 3,957,041; 4,002,499; 4,003,638; 4,230,095; 4,387,961; 4,359,265; and 5,289,356, which are incorporated here by reference as if set forth fully. The objective of the reflectors 216 and 218 is to reflect solar energy onto the central tube 224 and the absorber 226 to be taken out of the passive solar collector 208 for use in heating objects. The absorber 226 was shown in the '095 patent referred to above as being either along the center line 232 or perpendicular to it. It has been found that the solar collector 208 is more efficient when the absorber 226 is at an angle of about 90 degrees to the center line 232, inclining toward the reflectors 216, 218, or both. The center line 232 will normally be in the direction that the passive solar collector 208 is aimed in use, and is taken as the axis 234 of the passive solar collector 208 if the collector is built to a geometry that is not symmetrical. Possible aiming angles include but are not limited to the noon position of the sun at the equinoxes, an angle midway between that of the noon position at the equinoxes and that of the winter solstice, or an angle midway between that of the noon position of the sun at the equinoxes and that of the summer solstice, or any other angle selected to meet a particular purpose. FIGS. 29b, 29c, and 29d are cross-sectional views of alternate embodiments of the solar collector of FIGS. 28 and 29a. In FIG. 29b a receiver 225 is placed off center in comparison with the central tube 224 of FIG. 29a, and the reflectors 216 and 218 are separated by a gap 219 that has a gap loss suppression structure 221. The gap loss suppression structure 221 comprises several V-shaped portions connected to the reflectors 216 and 218. FIG. 29c has an alternate embodiment of a gap loss suppression structure 223 with a larger number of V-shaped portions. There is no limit to the number of V-shaped sections that may be used in the gap-loss suppression structures, and these structures need not be V-shaped, but can be of arbitrary shapes that can be fitted into the design rules described earlier. In both FIGS. 29b and 29c the receivers 225 may be circular or of any arbitrary cross-sectional shape. In FIGS. 29b, 29c, and 29d the reflectors 216 and 218 need not be smooth, but can be ridged with V shapes perpendicular to the axis of the receiver 225 or otherwise given an irregular, asymmetric geometry. FIGS. 29e and 29f show alternate versions of the receiver 225 of FIGS. 29b, 29c, and 29d.

Figure 30:
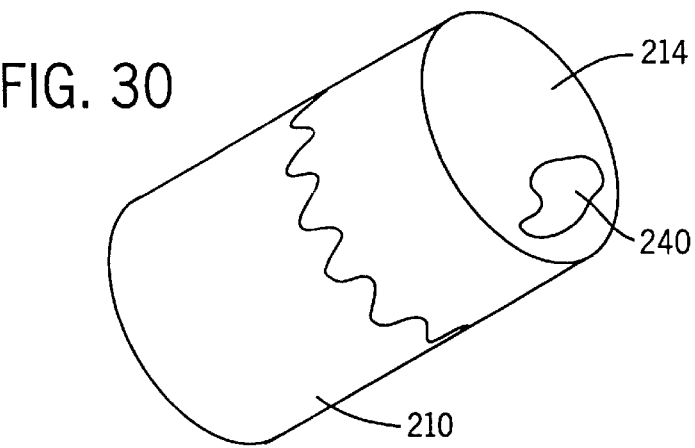
FIG. 30 is a view of a portion of the outer tube of FIGS. 28 and 29 showing a getter in place.

In FIG. 30, a deposited material 240 is a conventional getter that absorbs gases at lower temperatures and releases the gases at higher temperatures. The lower temperatures are selected to be those at which the passive solar collector 208 operates and the higher temperatures are those that approach a range in which the collector 208 will be damaged by overheating. Release of gas from the deposited material 240 will reduce the vacuum inside the housing 215 and reduce the thermal effectiveness of the collector 208 and will thus reduce the temperature of the collector 208.

Figure 31:
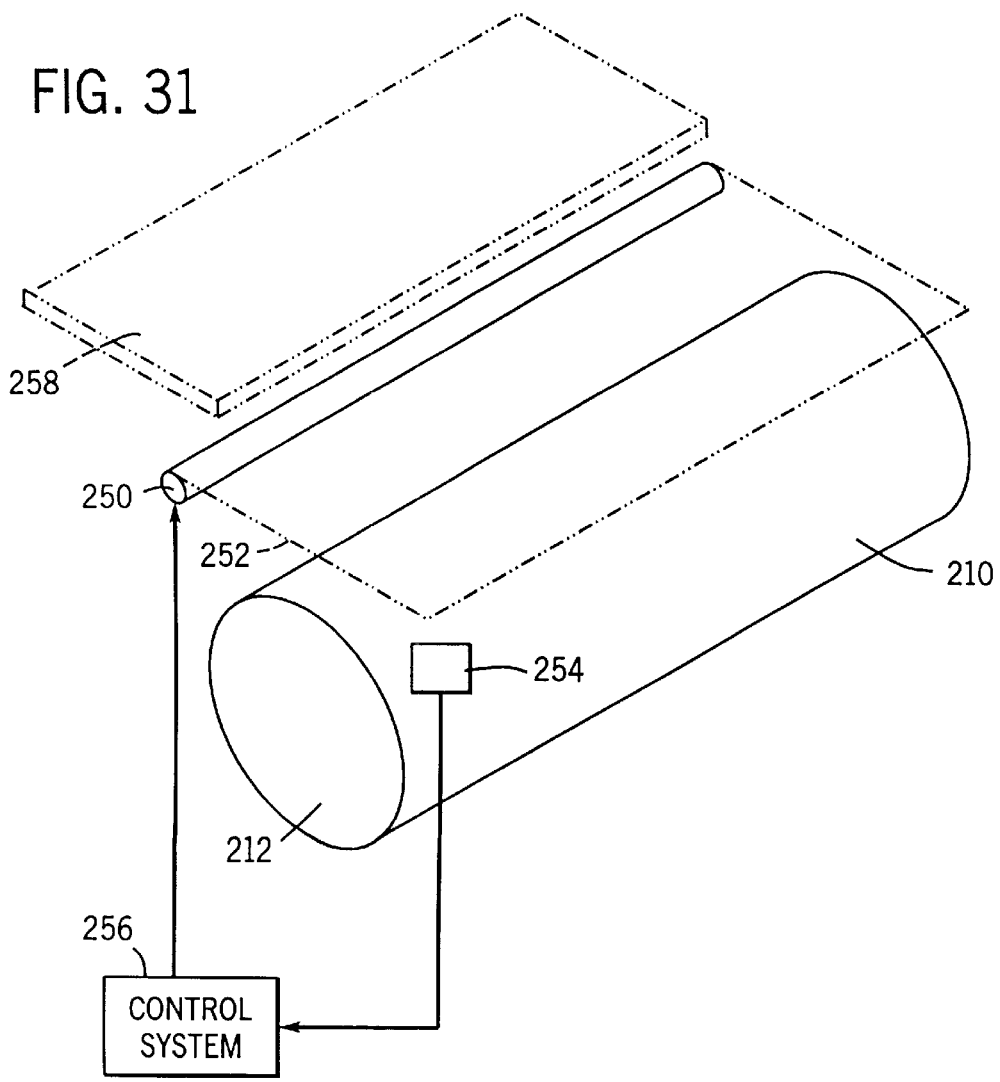
FIG. 31 is a view of a portion of the outer tube of FIGS. 28 and 29 showing a mechanical shade and a sensor and control system for the shade.

FIG. 31 is a view of a portion of the outer tube of FIGS. 28 and 29 showing a mechanical shade and a sensor and control system for the shade.

Figure 32:
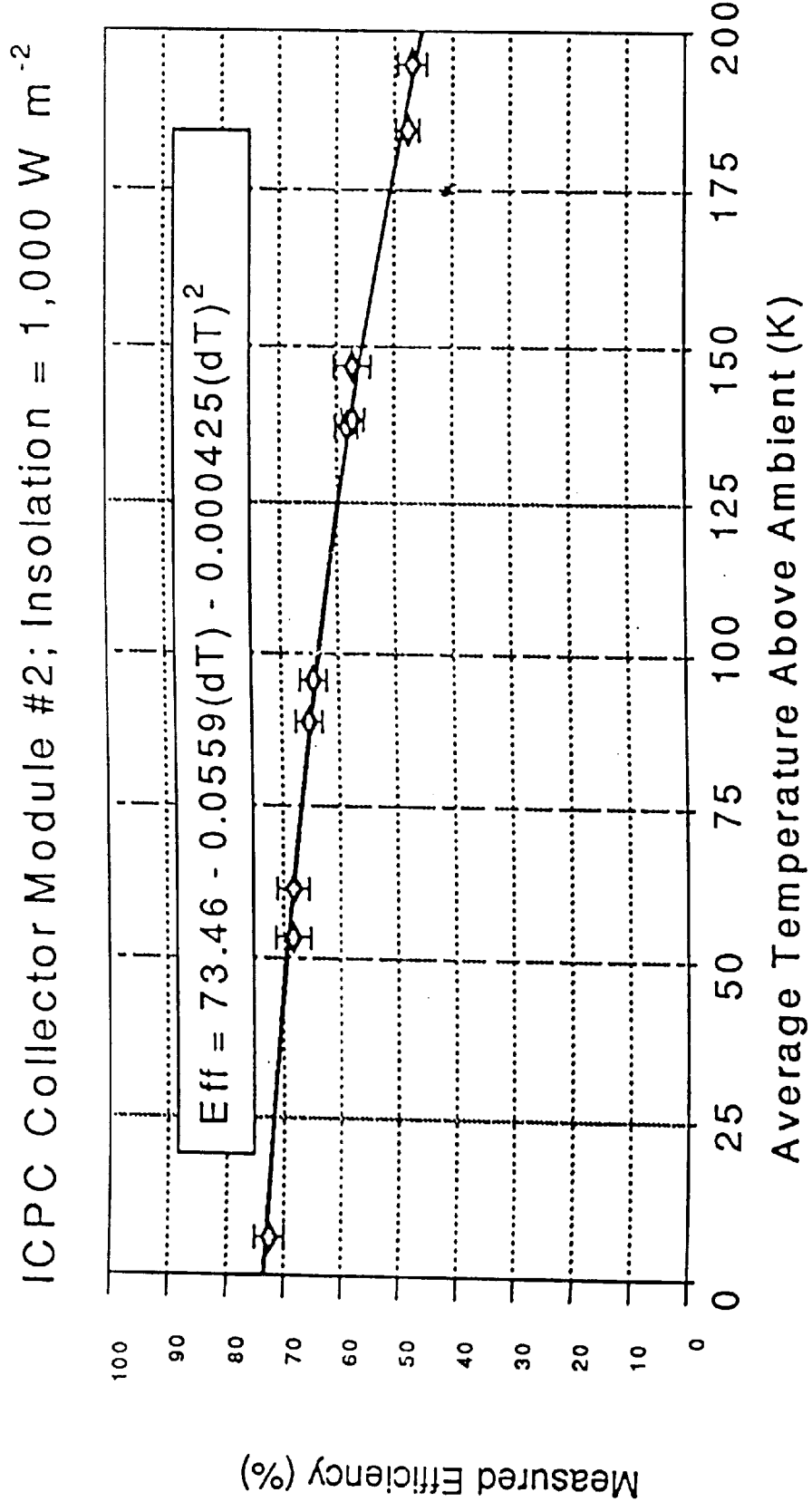
FIG. 32 is a plot of insolation and the rate of heat collection as a function of time by the apparatus of FIGS. 28 and 29 on a cloudy day.

In FIG. 31 a roller 250 supports a sheet 252 of flexible opaque material that is rolled onto the roller 250. A temperature sensor 254 is connected to the passive solar collector 210 to sense its temperature. When the temperature sensor 254 detects a temperature that is too high for the passive solar collector 208, the temperature sensor 254 causes a control system 256 to unroll the sheet 252 to cover the passive solar collector 208 before it is damaged by overheating. The control system could be a motor to unroll the sheet 252, The passive solar collector 208 could be protected as well by a rigid cover 258 that could be moved into place in response to a signal from the temperature sensor 254 and under control of the control system 256, or the cover 258 could be suspended by a fusible link 260 that would drop the cover 258 into place if the passive solar collector 8 became overheated. FIG. 32 is a plot of thermal performance of an apparatus analogous to that of FIGS. 28 and 29a. on a clear day.

Figure 33:
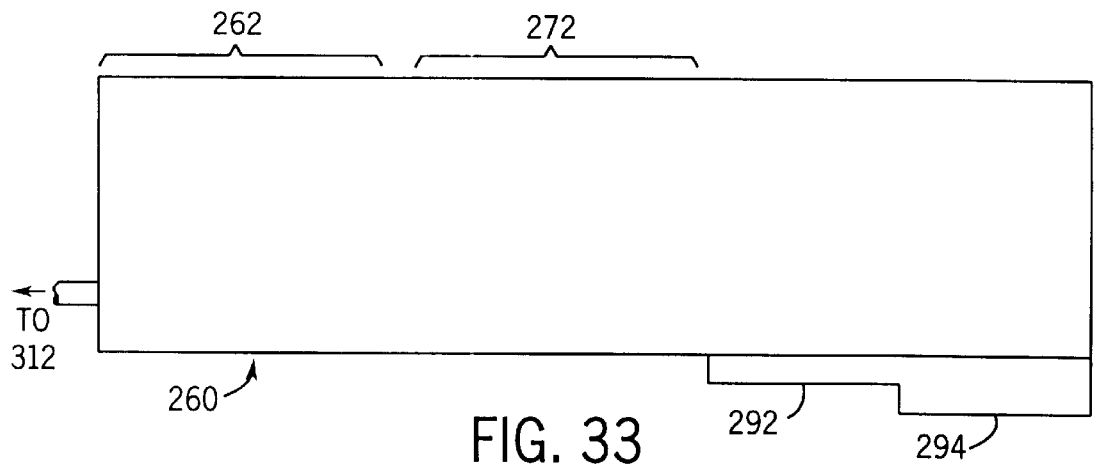
FIG. 33 is a side view of an alternate embodiment of a non-imaging solar collector of the present invention that includes several different types of treatment for the surface of the reflector.
Figure 34:
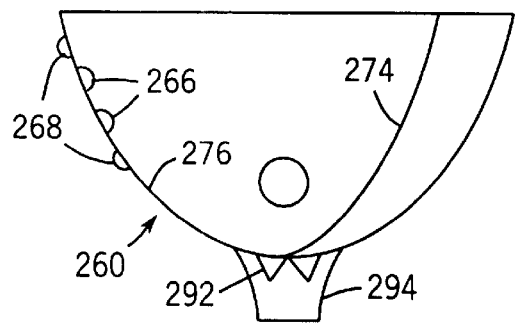
FIG. 34 is an end view of the collector of FIG. 33.
Figure 35:
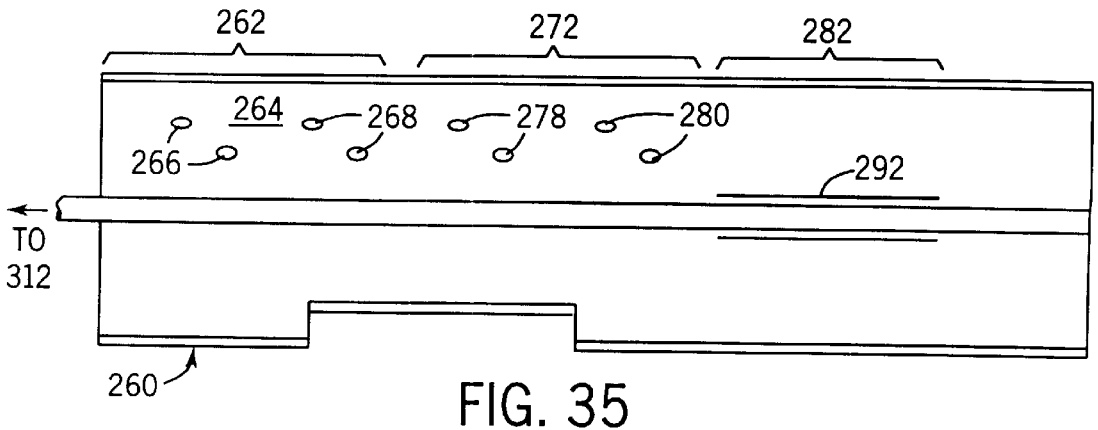
FIG. 35 is a top view of the collector of FIG. 33.
Figure 36:
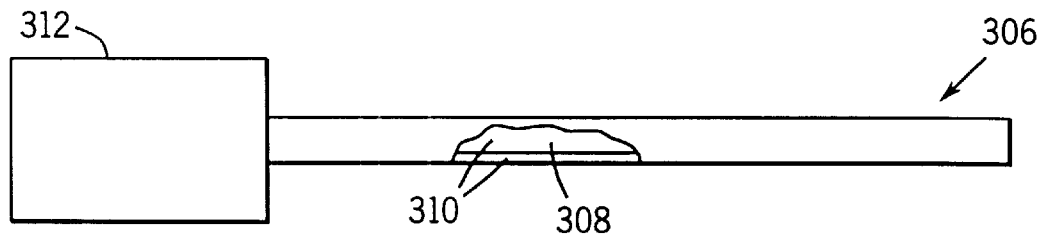
FIG. 36 is a partial sectional view of a liquid absorber 306 that circulates a liquid 308 through a double tube 310.
Figure 37:
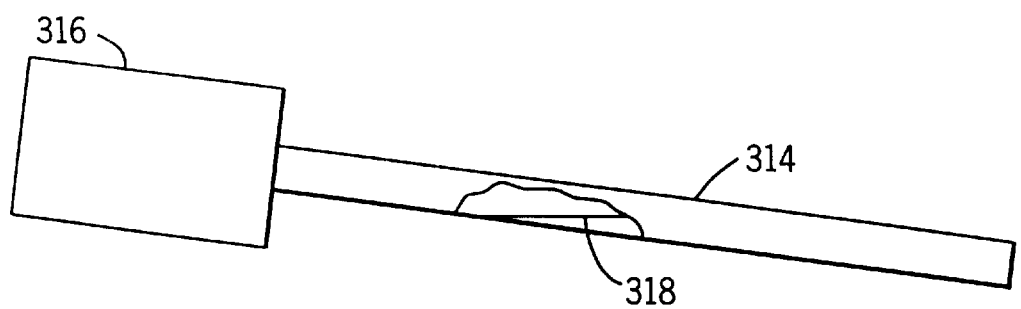
FIG. 37, the other type, is a partial sectional view of a heat pipe 314 that delivers heat to a heat exchanger 316.
Figure 38:
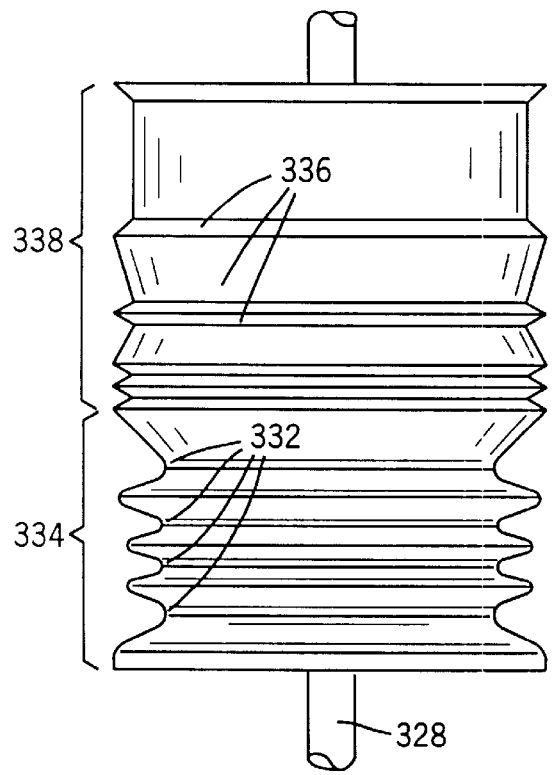
FIG. 38 is a top view of an alternate embodiment of a solar collector 330 that has ridges 332 that are smooth in a region 334 and ridges 336 that are jagged in a region 338.
Figure 39:
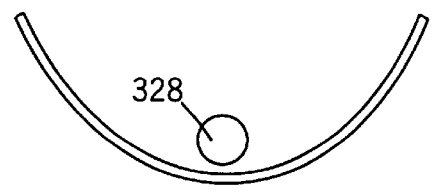
FIG. 39 is an end view of an alternate embodiment of a solar collector 330 that has ridges 332 that are smooth in a region 334 and ridges 336 that are jagged in a region 338.
Figure 40:
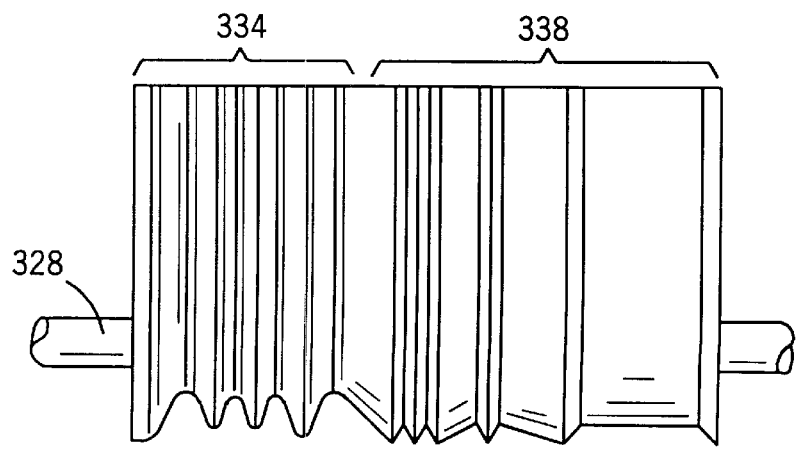
FIG. 40 is a side view of an alternate embodiment of a solar collector 330 that has ridges 332 that are smooth in a region 334 and ridges 336 that are jagged in a region 338.

FIG. 33 is a side view of an alternate embodiment of a non-imaging solar collector of the present invention that includes several different types of treatment for the surface of the reflector, FIG. 34 is an end view of the collector of FIG. 33, and FIG. 35 is a top view of the collector of FIG. 33. FIG. 38 is a top view, FIG. 39 is an end view, and FIG. 40 is a side view of an alternate embodiment of a solar collector 330 that has ridges 332 that are smooth in a region 334 and ridges 336 that are jagged in a region 338. In FIGS. 33, 34, 35, 38, 39, and 40, a solar collector 260 is in the form of a generalized trough. The solar collector 260 has a region 262 that has a surface 264 that generally exhibits cylindrical symmetry. The surface 264 may be smooth or it may contain a plurality of projections 266, dents 268, or both, placed regularly or irregularly on the surface 264. A region 272 is formed of asymmetric surfaces 274 and 276; either, both, or neither of the surfaces 274 and 276 also may contain a plurality of projections 278, dents 280, or both. While globally trough-like, the surfaces 274 and 276 depart locally from a cylindrically symmetrical trough to provide a superior impedance match between the solar energy incidence angles and the angular acceptance of the solar collector 260. In FIGS. 38, 39 and 40, a region 338 has ridges 336 that may be formed of planar surfaces that are bent into the general form of the solar collector 260 of FIGS. 33, 34, and 35, and a region 334 has ridges 332 that are multiply curved. The ridges 336 may have sharp edges where they join each other or they may have rounded edges. A solar collector 260 may have any or all of these projections 266, dents 268, ridges 336 and 332, sharp edges, rounded edges, or other shapes that can be optimized for light collection by computer analysis by a combination of Trnsys, a computer program referred to above, ray-tracing programs or the like. All of the surfaces 264, 274, and 276 may have or not have dents or depressions. The collector 260 may have a continuous surface, it may have a gap structure 292, or it may terminate in a light pipe 294. In FIGS. 33, 34, 35, 38, 39, and 40, reflected sunlight heats an absorber 304 that may be either of two types. FIG. 36 , one type, is a partial sectional view of a liquid absorber 306 that circulates a liquid 308 through a double tube 310. A heat exchanger 312 recovers the heat for use. FIG. 37, the other type, is a partial sectional view of a heat pipe 314 that delivers heat to a heat exchanger 316. A liquid 318 is the heat-transfer medium. The heat pipe 314 is partially evacuated and partly filled with the liquid 318. The heat pipe 314 of FIG. 37 has the advantages that it does not need to be pumped and that it is a dry connection, free from leaks and safe against overheating and freezing.

In addition to the irregularities in the surface of the collector 260 that have been described above, other irregularities can be constructed and optimized for collection by a heat pipe 328. FIG. 38 is a top view, FIG. 39 is an end view, and FIG. 40 is a side view of an alternate embodiment of a solar collector 330 that has ridges 332 that are smooth in a region 334 and ridges 336 that are jagged in a region 338. In FIGS. 38, 39, and 40, the ridges 332 and 336 may be in any 2. orientation and may have constant or varying amplitude and depth as a function of position along the solar collector 330.

One result of a solar collector is a hot glass tube or similar structure. To use the solar energy, it is necessary to extract the heat from the glass tube, which may be an ordinary glass tube, a Dewar, or the like. Extraction means establishing a thermal connection to the glass tube or similar structure, typically on the inside of the tube, with a fluid-carrying tube that is to be heated. The thermal connection may be established with a thermally-conducting metal fin or other heat exchanger that is thermally connected to the fluid-carrying tube. The thermal connection may also be established by packing the fluid-carrying tube in a grease or paste that also contacts the hot glass tube.

A useful adjunct to the present system is described in an article entitled "A Dielectric Omnidirectional Reflector," published in "Science", Vol. 282, Nov. 27, 1998, which article is incorporated here by reference as if set forth fully. In that article, a design criterion that permits truly omnidirectional reflectivity for all polarizations of incident light over a wide selectable range of frequencies was used in fabricating an all-dielectric omnidirectional reflector consisting of multilayer films. The reflector was simply constructed as a stack of nine alternating micrometer-thick layers of polystyrene and tellurium and demonstrates omnidirectional reflection over the wavelength range from 10 to 15 micrometers. Because the omnidirectionality criterion is general, it can be used to design omnidirectional reflectors in many frequency ranges of interest. Potential uses depend on the geometry of the system. For example, coating of an enclosure will result in an optical cavity. A hollow tube will produce a low-loss, broadband waveguide, whereas a planar film could be used as an efficient radiative heat barrier or collector in thermoelectric devices. A commercial reflector with similar properties was announced by 3M Company in Photonics spectra of May 1999.

In an embodiment of the present invention that has been built and tested, the tube 210 was made of glass and was about two meters in length and of the order of 10 to 20 centimeters in diameter. These dimensions are presented for illustration and should not limit the scope of the claimed invention. The reflectors 216 and 218 in the embodiment that was built were silvered onto or otherwise provided with a reflective coating on the inner surface of the tube 210, so they were symmetric and represented sections of cylinders that were silvered or otherwise provided with a reflective coating for about 90 degrees. The absorber was a section of metal foil draped over the central tube 224 and connected along a line substantially parallel to the central tube 224 that was disposed near to or touching one or both of the reflectors 216 and 218 and at an angle of about 90 degrees with respect to the axis of the collector. Experimental results using this system showed effective collection of solar energy over a wide range of angles of incidence into the collector.

Other advantages and features of the invention may be seen by referring to the attached claims. In addition to the embodiments that have been described, it should be clear to one of ordinary skill in the art that changes in the methods of practicing the invention could be made without departing from the scope of the invention, which should be limited only by the claims and equivalents to the apparatus claimed in the claims.

APPENDIX

COMPUTER SOFTWARE PROGRAM

```
    program coordinates
    dimension r (1:200), theta(1:200), dzdx(1:200)
    dimension xx(1:200), zz (1:200)
    real 1, k1, k2, k3, k4
    parameter (degtorad = 3.1415927/180.0)
    write (*,*)'Enter radius of cylindrical absorber.'
    read (*,*) a
    write (*,*)'Enter gap size.'
    read (*,*) b
    write (*,*)'Enter constant.'
    read (*,*) c
    write (*,*)'Enter maximum height.'
    read (*,*) h
GENERATE 50 POINTS OF AN INVOLUTE
    alpha0 = acos (a/(a + b))
    do 100 i = 1, 50, 1
        alpha = ((90*degtorad–alpha0)/49.0)*float (i–50) + 90*degtorad
        d = (alpha–alpha0)*a + sqrt((a + b)**2 – a**2)
        x = a*sin(alpha) – d*cos(alpha)
        z = –a*cos(alpha) – d*sin(alpha)
        r(i) = sqrt (x**2 + z**2)
        theta(i) = atan (z/x)
        phi = theta(i) + (90.0*degtorad)
    continue
    theta (1) = –90.0*degtorad
GENERATE 150 POINTS OF THE WINSTON-TYPE
CONCENTRATOR
    v = 0.0
    h = 0.001
    phi0 = theta(50) + (90.0*degtorad) + 0.001
    phi = phi0
    f = alog(r(50))
    do 200 while(v.eq.0.0)
        phi = phi + h
        k1 = h*tan(0.5*((1.0–c)*phi + c*phi0 + asin(a/exp(f))))
        k2– h–tan(0.5*((1.0–c)*(phi + 0.5*h) + c*phi0+
   &    asin(a/exp(f + 0.5*k1))))
        k3 = h*tan(0.5*((1.0–c) * (phi + 0.5*h) + c*phi0 +
   &    asin (a/exp(f + 0.5*k2))))
        k4 = b*tan(0.5*((1.0–c)*(phi + h) + c*phi0 +
   &    asin(a/exp(f + k3))))
        f– f' (k1/6.0) + (k2/3.0) + (k3/3.0) + (k4/6.0)
        rad = exp(f)
        z = rad*sin(phi–(90*degtorad))
        if(z.ge.a) then
            phimax = phi
            write(*,*)'phimax = ',phi/degtorad
            v = 1.0
        endif
    continue
    f = alog(r(50))
    phi = (–1.0/149.0)*(phimax–phi0) + phi0
    h = (phimax phi0)/149.0
    do 300 i = 1,150,1
        phi = phi + h
        k1 = h*tan(0.5*((1.0–c)*phi + c*phi0 + asin(a/exp(f))))
        k2 = h*tan(0.5*((1.0–c)*(phi + 0.5*h) + c*phi0 +
   &    asin(a/exp(f + 0.5*k1))))
        k3 = h*tan(0.5*((1.0–c)*(phi + 0.5*h) + c*phi0 +
   &    asin(a/exp(f + 0.5*k2))))
        k4 = h*tan(0.5*((1.0–c)*(phi + h) + c*phi0 +
   &    asin(a/exp(f + k3))))
        f = f + (k1/6.0) + (k2/3.0) + (k3/3.0) + (k4/6.0)
        r(i + 50) = exp(f)
```

APPENDIX-continued

COMPUTER SOFTWARE PROGRAM

```
    theta(i + 50) = phi - (90.0*degtorad)
continue
    stop
end
```

I claim:

1. A passive solar collector wherein the sun is taken as a point source, comprising:
   a) a tube that is at least partially transparent;
   b) a first end and a second end connected to the tube to form a housing that can sustain a partial vacuum inside the housing;
   c) a first reflector disposed within the housing to reflect light from the point source that enters the housing, said first reflector comprising a reflective surface having a two dimensional shape having a longitudinal axis, said shape defined by integrating a differential equation of polar coordinates defined by:

$$\frac{d\overline{R}}{d\phi} = \overline{R}\tan\alpha;$$

where $\overline{R}$ is a radius vector from an origin to a point of reflection of a light edge ray from a reflector surface and $\phi$ is an angle between the $\overline{R}$ vector and an exit aperture external point of said concentrator and coordinates (R, $\phi$) represent a point on a reflector curve and a is an angle the light edge ray from an origin point makes with a normal to said reflector curve, said reflector surface defined by said reflector curve which allows said light edge ray on said reflector curve to vary as a function of position;
   d) a central tube disposed within the housing; and
   e) an absorber disposed within the housing so as to absorb light reflected by the first reflector and deliver absorbed light to the central tube.

2. The passive solar collector of claim 1 comprising in addition a second reflector disposed within the housing and wherein the absorber is disposed so as also to receive light from the second reflector.

3. The passive solar collector of claim 1 wherein the tube is glass.

4. The passive solar collector of claim 2 wherein the tube is glass.

5. The passive solar collector of claim 1 wherein the first reflector is a portion of the tube that is treated to provide a reflective coating.

6. The passive solar collector of claim 1 wherein the first reflector is a shaped reflector.

7. The passive solar collector of claim 1 wherein the first reflector is a shaped metal reflector.

8. The passive solar collector of claim 2 wherein the first and second reflectors are portions of the tube that are treated to provide a reflective coating.

9. The passive solar collector of claim 2 wherein the first and second reflectors are shaped reflectors.

10. The passive solar collector of claim 2 wherein the first and second reflectors are shaped metal reflectors.

11. The passive solar collector of claim 2 wherein one of the first and second reflectors is a portion of the tube that is treated to provide a reflective coating and another of the first and second reflectors is a shaped reflector.

12. The passive solar collector of claim 2 wherein the absorber is disposed at an angle between zero degrees and ninety degrees with respect to an axis of the passive solar collector.

13. The passive solar collector of claim 12 wherein the absorber is disposed at an angle of approximately 90 degrees with respect to the axis of the solar collector.

14. The passive solar collector of claim 1 wherein the absorber is disposed at an angle between zero and ninety degrees with respect to an axis of the solar collector.

15. The passive solar collector of claim 1 wherein the absorber is disposed at an angle of approximately 90 degrees with respect to an axis of the solar collector.

16. The passive solar collector of claim 2 comprising in addition:
   a) a sheet of opaque material;
   b) a temperature sensor that is responsive to temperature of the passive solar collector; and
   c) means for moving the sheet of opaque material to cover the passive solar collector to shield the passive solar collector if the temperature sensor detects an excessively high temperature.

17. The passive solar collector of claim 16 wherein the sheet of opaque material is flexible and wherein the means for moving the sheet of opaque material comprises a roller containing the sheet of opaque material in a rolled-up condition and a mechanism connected to the sensor for unrolling the sheet of opaque material to cover the collector in response to detection of the excessively high temperature.

18. The passive solar collector of claim 16 wherein the sheet of opaque material is substantially rigid and wherein the means for moving the sheet of opaque material comprises a hinged support adapted to swing the substantially rigid sheet of opaque material so as to cover the collector in response to detection of the excessively high temperature.

19. The passive solar collector of claim 1 comprising in addition:
   a) a sheet of opaque material;
   b) a temperature sensor that is responsive to temperature of the passive solar collector; and
   c) means for moving the sheet of opaque material to cover the passive solar collector to shield the passive solar collector if the temperature sensor detects an excessively high temperature.

20. The passive solar collector of claim 19 wherein the sheet of opaque material is substantially rigid and wherein the means for moving the sheet of opaque material comprises a hinged support adapted to swing the substantially rigid sheet of opaque material so as to cover the collector in response to detection of the excessively high temperature.

21. The passive solar collector of claim 20 wherein the sheet of opaque material is flexible and wherein the means for moving the sheet of opaque material comprises a roller containing the sheet of opaque material in a rolled-up condition and a mechanism connected to the sensor for unrolling the sheet of opaque material to cover the collector in response to detection of the excessively high temperature.

22. A passive solar collector comprising:
   a) a tube that is at least partially transparent;
   b) a first end and a second end connected to the tube to form a housing that can sustain a partial vacuum inside the housing;
   c) a first reflector disposed within the housing to reflect light that enters the housing said reflector having a contour defined by a reference line wherein $$\overline{R}(t) = \overline{k}(t) + D\overline{u}(t)$$

where D is a scalar denoting distance from a point on the reference line, $\bar{u}$ is a unit vector, $\bar{k}(t)$ is a vector from an origin point to a point t on the reference line and $\bar{R}(t)$ is a vector from the origin point to a point on the contour of the reflector;

d) a central tube disposed within the housing; and
e) a heat pipe disposed within the housing so as to absorb light reflected by the first reflector.

* * * * *